US011657393B2

(12) United States Patent
Shimizu

(10) Patent No.: US 11,657,393 B2
(45) Date of Patent: May 23, 2023

(54) PRIVILEGE GRANTING METHOD AND PRIVILEGE GRANTING DEVICE

(71) Applicant: KDDI CORPORATION, Tokyo (JP)

(72) Inventor: Tooru Shimizu, Tokyo (JP)

(73) Assignee: KDDI Corporation, Tokyo (JP)

( * ) Notice: Subject to any disclaimer, the term of this patent is extended or adjusted under 35 U.S.C. 154(b) by 422 days.

(21) Appl. No.: 17/029,358

(22) Filed: Sep. 23, 2020

(65) Prior Publication Data

US 2021/0097531 A1 Apr. 1, 2021

(30) Foreign Application Priority Data

Sep. 30, 2019 (JP) .............................. JP2019-179372
Sep. 30, 2019 (JP) .............................. JP2019-179380

(51) Int. Cl.
*G06Q 20/38* (2012.01)
*H04L 9/40* (2022.01)
(Continued)

(52) U.S. Cl.
CPC ........ *G06Q 20/387* (2013.01); *G06Q 20/3274* (2013.01); *G06Q 30/0238* (2013.01); *H04L 63/0853* (2013.01); *H04L 63/102* (2013.01)

(58) Field of Classification Search
CPC .............. G06Q 20/387; G06Q 20/3274; G06Q 30/0238; H04L 63/0853; H04L 63/102
See application file for complete search history.

(56) References Cited

U.S. PATENT DOCUMENTS 7,801,771 B1* 9/2010 Sirota ................ G06Q 20/3672
   705/26.1
7,881,342 B2* 2/2011 Mirmobini ....... H04N 21/23614
   370/476
(Continued)

FOREIGN PATENT DOCUMENTS

JP     2007-115235 A    5/2007
JP     2016-071652 A    5/2016
(Continued)

OTHER PUBLICATIONS

Office Action issued in corresponding Japanese Application No. 2021-047663 dated Oct. 5, 2021 with English translation.
(Continued)

*Primary Examiner* — Michael I Ezewoko
(74) *Attorney, Agent, or Firm* — Foley & Lardner LLP

(57) ABSTRACT

A settlement device includes an application reception unit that associates and stores a user ID for specifying a user and application information indicating an application to grant a privilege at the time of purchase of a target commodity in a storage unit when the user ID and the application information are acquired, a token generation unit that generates a settlement token and transmits the settlement token to a user terminal when a request for acquiring the user ID and a settlement code is received from a user terminal, a settlement information reception unit that is configured to receive the settlement information used to perform settlement of commodities, the settlement token, and privilege target commodity information for specifying a commodity which is a privilege target from a store terminal that is configured to read the settlement code according to the settlement token, and a privilege granting unit that is configured to grant the privilege corresponding to application information to the user when the application information associated with (Continued)

the user ID corresponding to the received settlement token corresponds to the received privilege target commodity information.

11 Claims, 12 Drawing Sheets

(51) Int. Cl.
*G06Q 30/0238* (2023.01)
*G06Q 20/32* (2012.01)

(56) References Cited

U.S. PATENT DOCUMENTS

| | | | | |
|---|---|---|---|---|
| 8,024,225 | B1* | 9/2011 | Sirota | G06Q 30/06 |
| | | | | 705/26.1 |
| 8,751,314 | B2* | 6/2014 | Fisher | G06Q 20/325 |
| | | | | 235/382 |
| 10,609,026 | B2* | 3/2020 | Han | H04W 12/086 |
| 2013/0325567 | A1* | 12/2013 | Bradley | G06Q 30/02 |
| | | | | 705/14.1 |

FOREIGN PATENT DOCUMENTS

| | | |
|---|---|---|
| JP | 2016-514312 A | 5/2016 |
| JP | 2016-173752 A | 9/2016 |
| JP | 6473539 B1 | 2/2019 |
| JP | 6502557 B | 4/2019 |
| JP | 6528160 B1 | 6/2019 |
| JP | 2019-113924 A | 7/2019 |
| JP | 2019-145071 A | 8/2019 |

OTHER PUBLICATIONS

Office Action issued in corresponding Japanese Patent Application No. 2021-023195 dated May 25, 2021 with English translation.

* cited by examiner

FIG. 5

| USER ID | APPLICATION DATE | APPLICATION INFORMATION | | | |
|---|---|---|---|---|---|
| | | STORE ID | COMMODITY ID | CONTENT OF PRIVILEGE | ... |
| 1230044 | 9/1 10:00 | s001 | i382 | 50 YEN DISCOUNT | ... |
| 3200110 | 9/1 12:00 | s001 | i382 | 50 YEN DISCOUNT | ... |
| 3200110 | 9/2 13:13 | s001 | i2610 | 100 YEN DISCOUNT | ... |
| 2365556 | 9/2 19:22 | s002 | i97369 | 30 YEN DISCOUNT | ... |
| ... | ... | ... | ... | ... | ... |

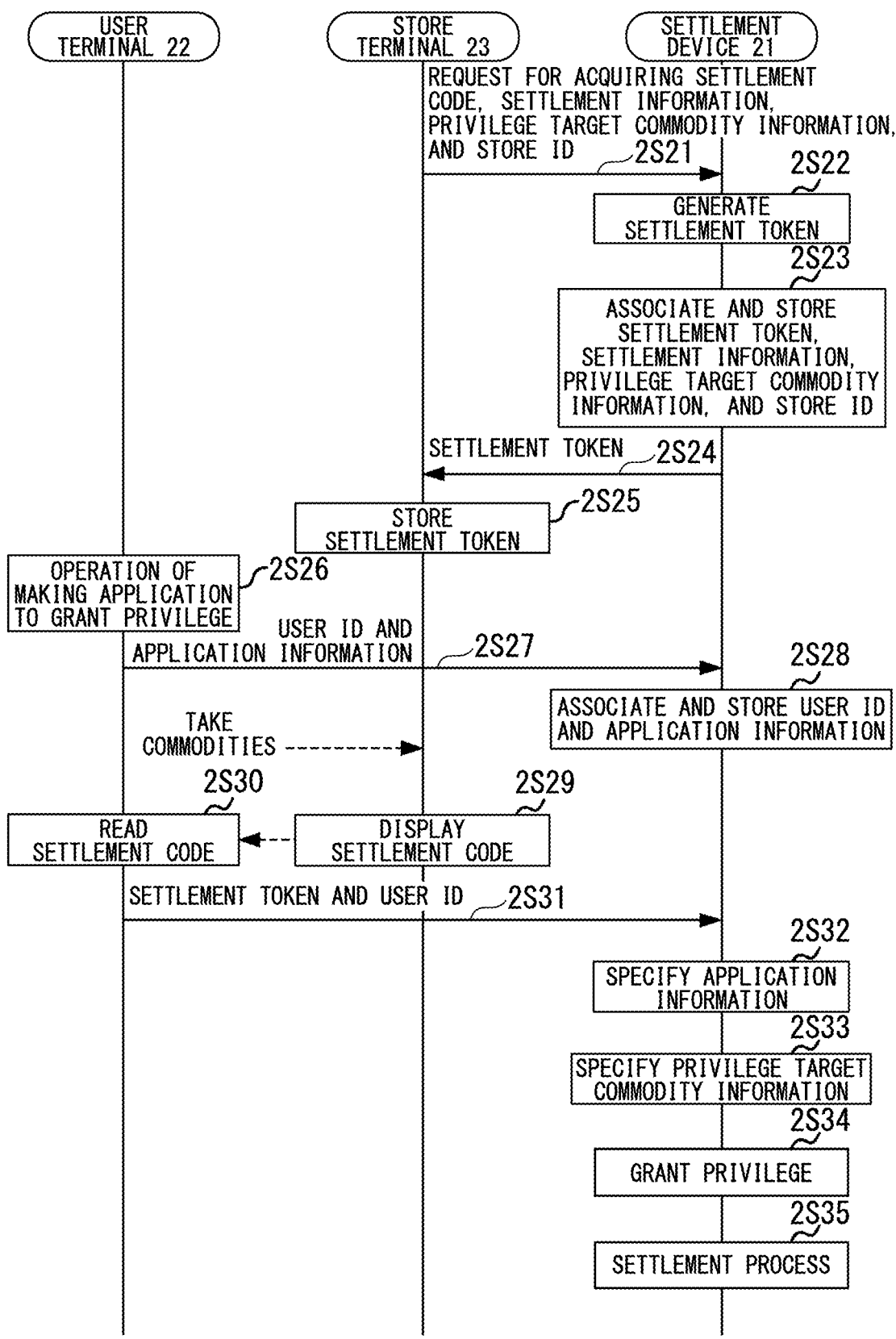

PRIVILEGE GRANTING METHOD AND PRIVILEGE GRANTING DEVICE

BACKGROUND

Field of the Invention

The present invention relates to a privilege granting method and a privilege granting device.

Priority is claimed on Japanese Patent Application No. 2019-179372 and Japanese Patent Application No. 2019-179380, filed Sep. 30, 2019, the content of which is incorporated herein by reference.

Description of Related Art

Code settlement in which a 2-dimensional barcode such as a QR code (registered trademark) is used has become widespread (for example, see Japanese Patent No. 6528160 and Japanese Patent No. 6473539). Code settlement is performed by reading a 2-dimensional barcode displayed by a store using a user terminal or causing a store to read a 2-dimensional barcode displayed by a user terminal.

SUMMARY

In the code settlement of the related art, a privilege such as a discount, i.e., reducing a payment amount can be granted at the time of settlement, but there is a problem that the privilege may not be able to be granted at the time of settlement in response to purchase of a specific commodity.

Accordingly, it is desirable to provide a privilege granting method and a privilege granting device capable of granting a privilege at the time of settlement according to purchase of a specific commodity.

According to a first aspect of the present invention, a privilege granting method causes a computer to perform: acquiring a user identifier for specifying a user and application information indicating an application to grant a privilege at the time of purchase of a target commodity to which the privilege is granted in response to purchase from the user; associating and storing the application information and the user identifier in a storage unit; receiving the user identifier and a request for acquiring a settlement code for settlement in a store by the user from a user terminal of the user; generating a settlement token for generating the settlement code when the request for acquiring the settlement code is received; transmitting the generated settlement token to the user terminal; receiving settlement information used to perform settlement of one or more commodities, the settlement token, and privilege target commodity information for specifying one or more target commodities among the one or more commodities from a store terminal that is configured to read the settlement code displayed by the user terminal according to the settlement token; specifying the application information associated with the user identifier corresponding to the settlement token and stored in the storage unit when the settlement token is received from the store terminal; and granting a privilege corresponding to the application information to the user when the specified application information corresponds to the received privilege target commodity information.

According to a second aspect of the present invention, a privilege granting device includes: an application reception unit configured to associate and store a user identifier for specifying a user and application information indicating an application to grant a privilege at the time of purchase of a target commodity to which the privilege is granted in response to the purchase in a storage unit when the user identifier and the application information are acquired from the user; a token generation unit configured to generate a settlement token for generating a settlement code and transmit the generated settlement token to a user terminal of the user when the user identifier and a request for acquiring the settlement code for settlement in a store by the user are received from the user terminal; a settlement information reception unit configured to receive settlement information used to perform settlement of one or more commodities, the settlement token, and privilege target commodity information for specifying one or more target commodities among the one or more commodities from a store terminal that is configured to read the settlement code displayed by the user terminal according to the settlement token; and a privilege granting unit configured to specify the application information associated with the user identifier corresponding to the settlement token and stored in the storage unit when the settlement token is received from the store terminal and to grant a privilege corresponding to the application information to the user when the specified application information corresponds to the received privilege target commodity information.

According to a third aspect of the present invention, a privilege granting method causes a computer to perform: acquiring a user identifier for specifying a user and application information indicating an application to grant a privilege at the time of purchase of a target commodity to which the privilege is granted in response to purchase from the user; associating and storing the application information and the user identifier in a storage unit; receiving settlement information used to perform settlement of one or more commodities and privilege target commodity information for specifying one or more target commodities among the one or more commodities from a store terminal and receiving a request for acquiring a settlement code for settling in a store by the user; generating a settlement token for generating the settlement code when the request for acquiring the settlement code is received; associating and storing the generated settlement token and the privilege target commodity information in the storage unit; transmitting the generated settlement token to the store terminal; receiving the settlement token and the user identifier from a user terminal that is configured to read the settlement code displayed by the store terminal according to the settlement token; and granting a privilege corresponding to the application information to the user when the application information associated with the user identifier received from the user terminal and stored in the storage unit corresponds to the privilege target commodity information associated with the settlement token received from the user terminal and stored in the storage unit.

According to a fourth aspect of the present invention, a privilege granting device includes: an application reception unit configured to associate and store a user identifier for specifying a user and application information indicating an application to grant a privilege at the time of purchase of a target commodity to which the privilege is granted in response to the purchase in a storage unit when the user identifier and the application information are acquired from the user; a token generation unit configured to generate a settlement token for generating a settlement code for settlement in a store by the user when settlement information used to perform settlement of one or more commodities and privilege target commodity information for specifying one or more target commodities among the one or more commodities are received and a request for acquiring the settlement code is received from a store terminal, to associate and store the generated settlement token and the privilege target commodity information in the storage unit, and to transmit the generated settlement token to the store terminal; a token reception unit configured to receive the settlement token and the user identifier from a user terminal that is configured to read the settlement code displayed by the store terminal according to the settlement token; and a privilege granting unit configured to grant a privilege corresponding to the application information to the user when the application information associated with the user identifier received from the user terminal and stored in the storage unit corresponds to the privilege target commodity information associated with the settlement token received from the user terminal and stored in the storage unit.

According to the present invention, it is possible to obtain the advantage that a privilege can be granted at the time of settlement according to purchase of a specific commodity.

BRIEF DESCRIPTION OF THE DRAWINGS

FIG. 5 is a table illustrating an example of application management information stored in a storage unit according to the first embodiment and a second embodiment.

FIG. 12 is a sequence diagram illustrating an acquisition requesting operation for a settlement code by the store terminal in the settlement system according to the second embodiment.

DETAILED DESCRIPTION OF EMBODIMENTS

Overview of settlement system 1S

Figure 1:
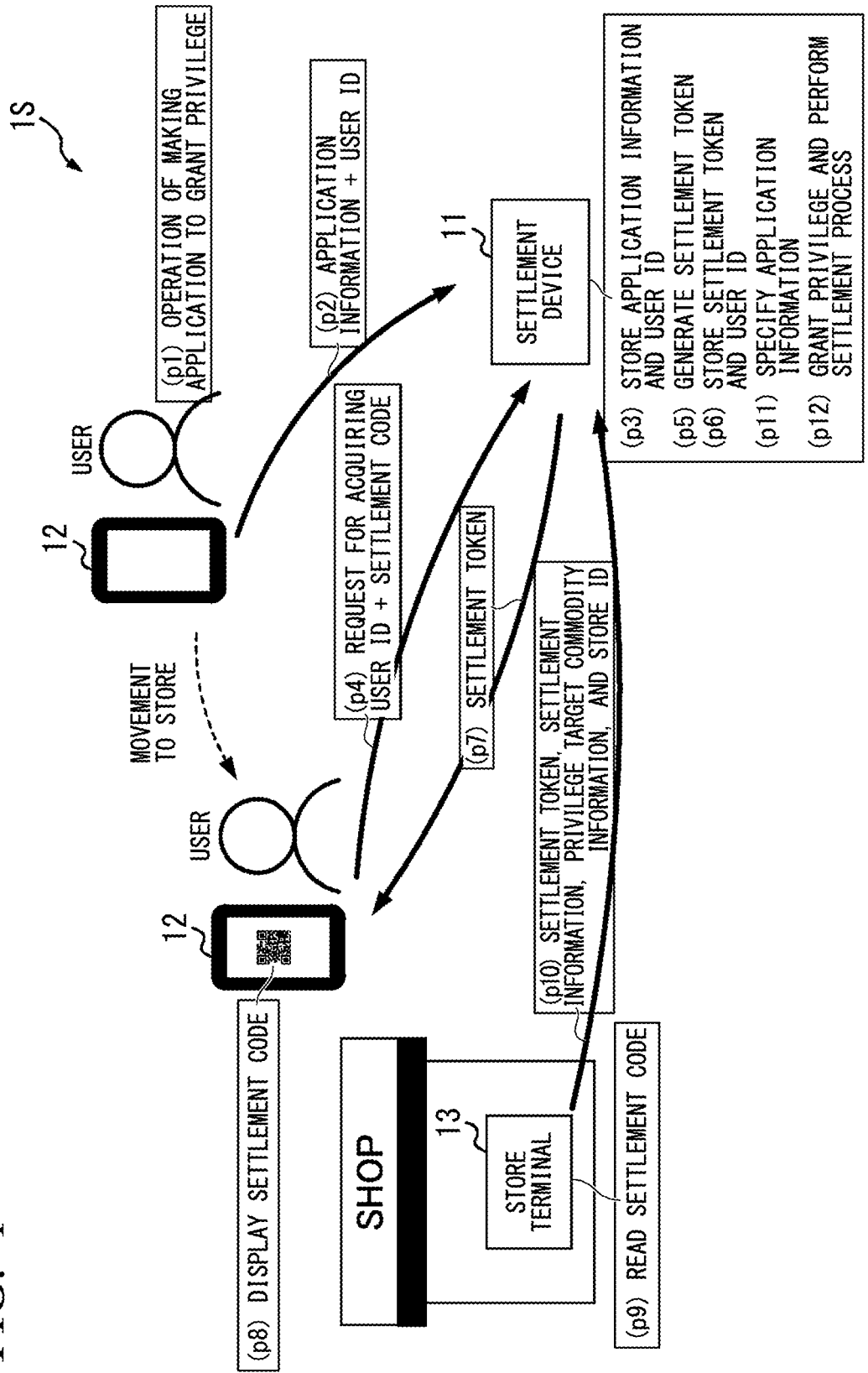
FIG. 1 is a diagram illustrating an overview of a settlement system according to a first embodiment of the present invention.

FIG. 1 is a diagram illustrating an overview of a settlement system 1S according to a first embodiment of the present invention. The settlement system 1S is a system that displays a settlement code on a user terminal in response to a request from a user terminal carried by a user and performs settlement in response to reading of a settlement code in a store when the user purchases commodities in a store. The settlement system 1S functions as a privilege granting system that grants a privilege, such as a discount (reducing a payment amount), issuance of a coupon, and so on, to the user at the time of settlement. The settlement code is text or an image read in a terminal of the store used for adjustment in a store and is a code used at the time of settlement.

The settlement system 1S includes a settlement device 11, a user terminal 12, and a store terminal 13. The settlement device 11 is a server that performs settlement of a purchase price. The settlement device 11 also functions as a privilege granting device that grants the privilege to a user. In the embodiment, the privilege is granted in response to purchase of a specific commodity by a user. In the following description, a specific commodity to which the privilege is granted is referred to as a target commodity.

The user terminal 12 is an information terminal that is used by the user and is, for example, a smartphone, a tablet, or a personal computer. A commodity seller that provides the privilege provides information regarding granting of the privilege to the user terminal 12 using an advertisement delivery function via the Internet.

A privilege is granted to the user at the time of purchase of a target commodity when the user makes an application to grant the privilege in advance. Hereinafter, a flow until settlement of the price of a commodity and granting of the privilege will be described with reference to FIG. 1.

The user performs an operation of making an application to grant the privilege in the user terminal 12 ((p1) in FIG. 1). For example, when the user activates application software for settlement and inputs a user ID as a user identifier for identifying the user, the user terminal 12 transmits the user ID to a settlement service provider and logs in an application. Then, the user terminal 12 inquires of a server of the settlement service provider about the privilege for which the user can apply.

The server of the settlement service provider associate and stores a privilege ID for identifying the privilege, content of the privilege, a commodity ID serving as commodity identification information for identifying a target commodity, and a commodity name. The server of the settlement service provider reads the privilege ID of the privilege for which the user can apply from a storage medium (for example, a hard disk) and transmits the content of the privilege corresponding to the read privilege ID, the commodity ID, and the commodity name to the user terminal 12.

The user terminal 12 displays the received content of the privilege, commodity ID, and commodity name. When the user performs an operation of selecting the privilege to make the application, the user terminal 12 transmits application information indicating an application to grant the selected privilege and the user ID to the settlement device 11 ((p2) in FIG. 1). When the application information and the user ID are received, the settlement device 11 associates and stores the application information and the user ID ((p3) in FIG. 1).

Thereafter, the user moves to a store and purchases commodities including a target commodity in the store. When accounting is performed in the store, the user activates application software for settlement and performs an operation of displaying a settlement code on the user terminal 12. When the operation of displaying the settlement code is received, the user terminal 12 transmits a request for acquiring the user ID and the settlement code to the settlement device 11 ((p4) in FIG. 1).

When the request for acquiring the user ID and the settlement code is received from the user terminal 12, the settlement device 11 generates a settlement token ((p5) in FIG. 1). The settlement token is a data string used for the user terminal 12 to generate a settlement code presented by the user in the store. The settlement device 11 associates and stores the generated settlement token and the user ID in a storage medium ((p6) in FIG. 1).

The settlement device 11 transmits the generated settlement token to the user terminal 12 ((p7) in FIG. 1). After the settlement token is encrypted, the settlement device 11 may transmit the encrypted settlement token to the user terminal 12.

The user terminal 12 generates and displays the settlement code on the basis of the received settlement token ((p8) in FIG. 1).

The user presents the settlement code at the time of adjustment of the purchase prices of commodities in a register of the store. Then, for example, the store terminal 13 reads the settlement code displayed on the user terminal 12 through an operation by a store staff member ((p9) in FIG. 1).

The store terminal 3 transmits settlement information indicating a total amount of the commodities purchased by the user, the settlement token indicated by the read settlement code, privilege target commodity information for specifying the privilege target commodity, and the store ID to the settlement device 11 ((p10) in FIG. 1). The privilege target commodity information is information for specifying a target commodity to which the privilege is granted among the commodities purchased by the user in the store and includes a commodity ID of the target commodity. When the store terminal 13 transmits the privilege target commodity information to the settlement device 11, the settlement device 11 can determine whether the user purchases the target commodity.

When the settlement device 11 receives the settlement token from the store terminal 13, the settlement device 11 determines whether the received settlement token matches the settlement token transmitted by the user terminal 12. When the settlement device 11 determines that the settlement tokens match each other, the settlement device 11 specifies the user ID associated with the received settlement token and specifies the application information associated with the specified user ID ((p11) in FIG. 1).

The settlement device 11 determines whether the commodity ID of the target commodity included in the specified application information is included in the commodity ID of the target commodity included in the received privilege target commodity information from a settlement price indicated by the settlement information received from the store terminal 13. When the commodity ID of the target commodity included in the application information is included in the commodity ID corresponding to the received privilege target commodity information, the settlement device 11 grants the privilege to the user by determining a price which is obtained after subtraction of a discount amount and serves as the privilege corresponding to the application information as a settlement price of the user. Then, the settlement device 11 performs a settlement process based on the determined settlement price ((p12) in FIG. 1). When the settlement process ends, the settlement device 11 notifies at least one of the user terminal 12 and the store terminal 13 of the end of the settlement process and a result obtained by applying the privilege.

When the user merely applies for the privilege to be granted in advance and subsequently presents the settlement code displayed on the user terminal 12 to the store at the time of purchase of the commodities including the target commodities, and a store staff member of the store performs a normal process of reading the settlement code and performing settlement, the settlement system 1S can operate the above operation to grant the privilege based on the purchase of the target commodity at the time of settlement.

Hereinafter, the details of the configurations of the settlement device 11, the user terminal 12, and the store terminal 13 will be described. In the following description, the content of the privilege which is a discount of a price of a commodity will be described as an example.

Functional Configuration of Settlement Device 11

Figure 2:
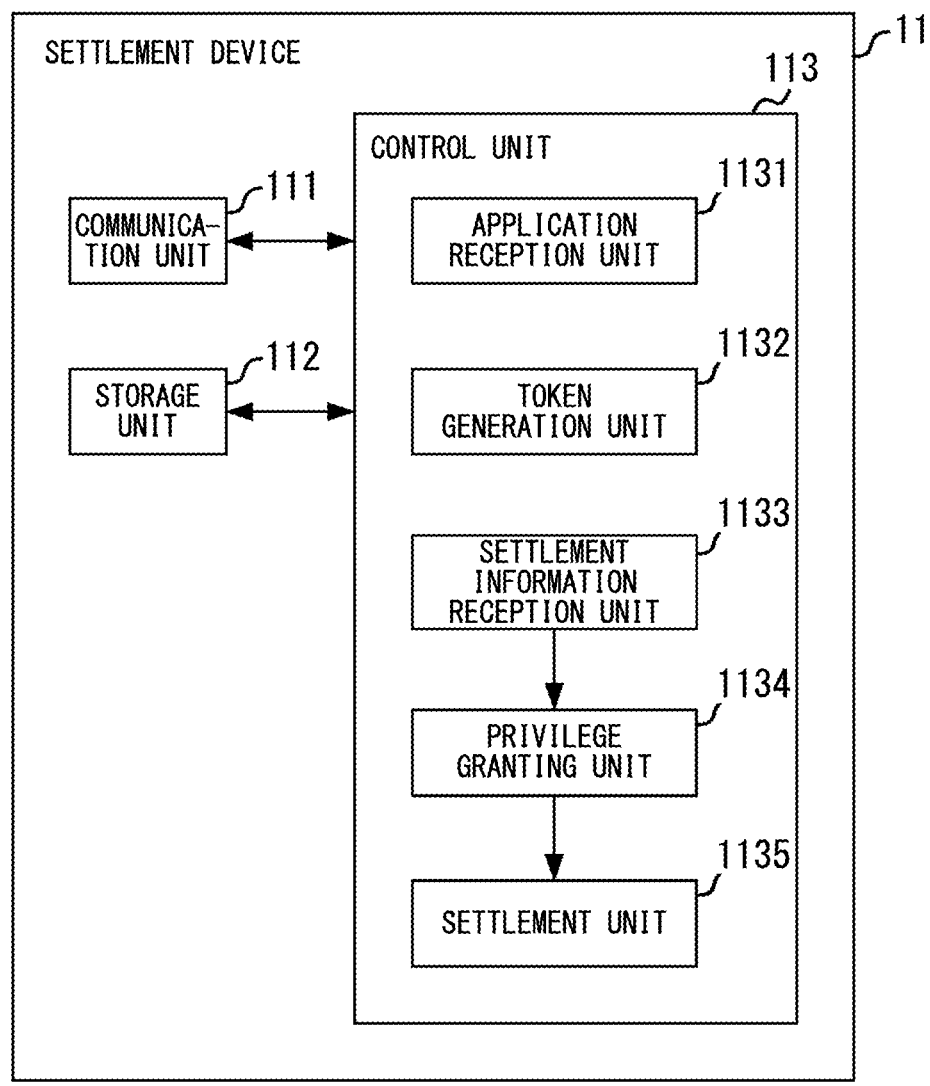
FIG. 2 is a block diagram illustrating a functional configuration of a settlement device according to the first embodiment.

FIG. 2 is a block diagram illustrating a functional configuration of the settlement device 11. The settlement device 11 includes a communication unit 111, a storage unit 112, and a control unit 113.

The communication unit 111 is a communication interface that transmits and receives data to and from the user terminal 12 and the store terminal 13 via a network such as the Internet.

The storage unit 112 is a storage medium that stores various kinds of data and includes a read-only memory (ROM), a random access memory (RAM), and a hard disk. The storage unit 112 stores a program that is executed by the control unit 113. The storage unit 112 stores a settlement program causing the control unit 113 to function as an application reception unit 1131, a token generation unit 1132, a settlement information reception unit 1133, a privilege granting unit 1134, and a settlement unit 1135.

The storage unit 112 associates and stores application information acquired from the user terminal 12 and the user ID. The storage unit 112 associates and stores the settlement token generated by the control unit 113 and the user ID acquired from the user terminal 12.

The control unit 113 is, for example, a central processing unit (CPU). The control unit 113 functions as the application reception unit 1131, the token generation unit 1132, the settlement information reception unit 1133, the privilege granting unit 1134, and the settlement unit 1135 by executing the settlement program stored in the storage unit 112. The details of an operation of each unit of the control unit 113 will be described below.

Functional Configuration of User Terminal 12

Figure 3:
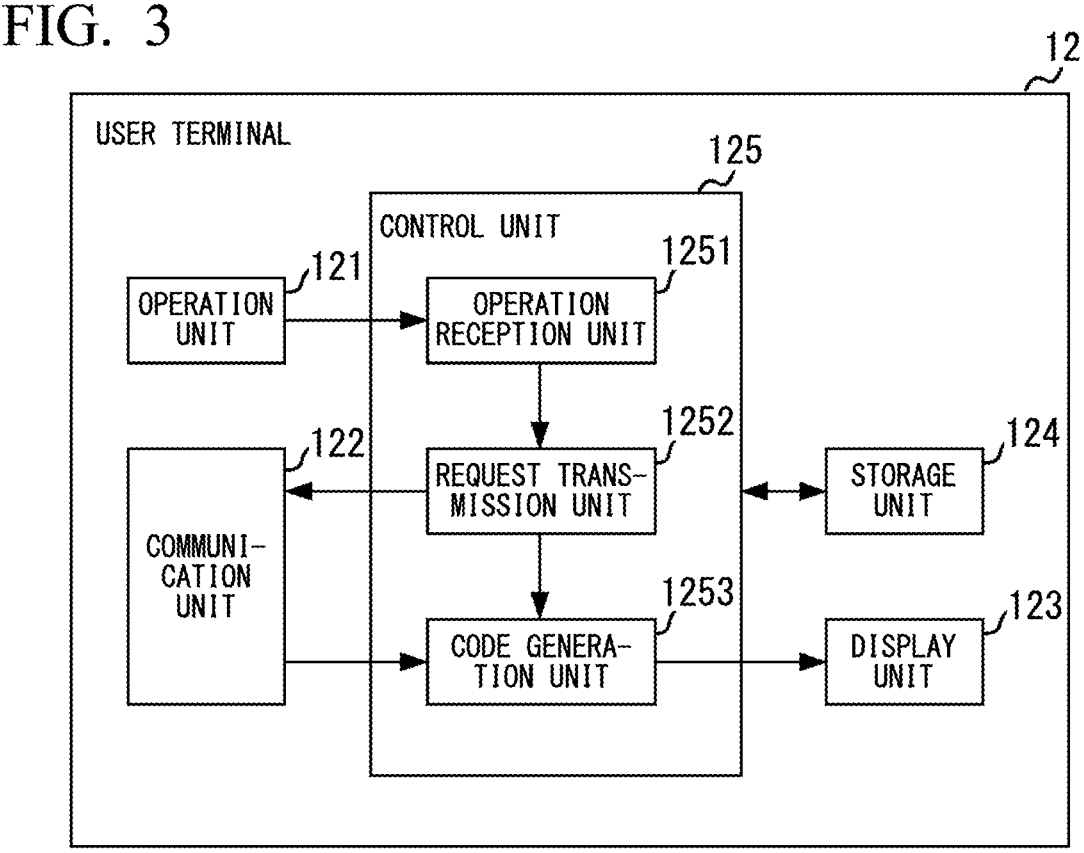
FIG. 3 is a block diagram illustrating a functional configuration of a user terminal according to the first embodiment.

FIG. 3 is a diagram illustrating a functional configuration of the user terminal 12. The user terminal 12 includes an operation unit 121, a communication unit 122, a display unit 123, a storage unit 124, and a control unit 125. The control unit 125 includes an operation reception unit 1251, a request transmission unit 1252, and a code generation unit 1253.

The operation unit 121 is an operation device that receives a user operation and is, for example, a touch panel provided on the surface of the display unit 123. The operation unit 121 notifies the operation reception unit 1251 of a signal indicating a position touched by the user.

The communication unit 122 is a wireless communication interface that transmits and receives data to and from, for example, a base station of a mobile phone network. The communication unit 122 transmits application information input from the request transmission unit 1252 to the settlement device 11. The communication unit 122 inputs the settlement token or the like received from the settlement device 11 to the code generation unit 1253.

The display unit 123 is a display that displays various kinds of information. The display unit 123 displays the settlement code under the control of the code generation unit 1253.

The storage unit 124 is a storage medium including a ROM and a RAM. The storage unit 124 stores a program which is executed by the control unit 125. The storage unit 124 stores a program that causes the control unit 125 to function as the operation reception unit 1251, the request transmission unit 1252, and the code generation unit 1253. The storage unit 124 stores the settlement token received from the settlement device 11 and the settlement code generated based on the settlement token.

The control unit 125 is, for example, a CPU and functions as the operation reception unit 1251, the request transmission unit 1252, and the code generation unit 1253 by executing a program stored in the storage unit 124.

The operation reception unit 1251 specifies operation content of the user based on the signal input from the operation unit 121. The operation reception unit 1251 notifies the request transmission unit 1252 of the operation content when the specified operation content is an operation of making an application to grant the privilege. When the operation reception unit 1251 receives the operation of making the application to grant the privilege, the request transmission unit 1252 transmits the user ID and the application information to the settlement device 11 via the communication unit 122.

When the specific operation content is an operation of displaying the settlement code on the user terminal 12, the operation reception unit 1251 notifies the request transmission unit 1252 of the operation content. When the operation reception unit 1251 receives the operation of displaying the settlement code on the user terminal 12, the request transmission unit 1252 transmits the user ID and the request for acquiring the settlement code to the settlement device 11 via the communication unit 122.

When the settlement token is transmitted from the settlement device 11, the code generation unit 1253 generates a settlement code based on the settlement token. For example, the code generation unit 1253 generates the settlement code based on a pre-decided rule. The code generation unit 1253 displays the generated settlement code on the display unit 123.

Functional Configuration of Store Terminal 13

Figure 4:
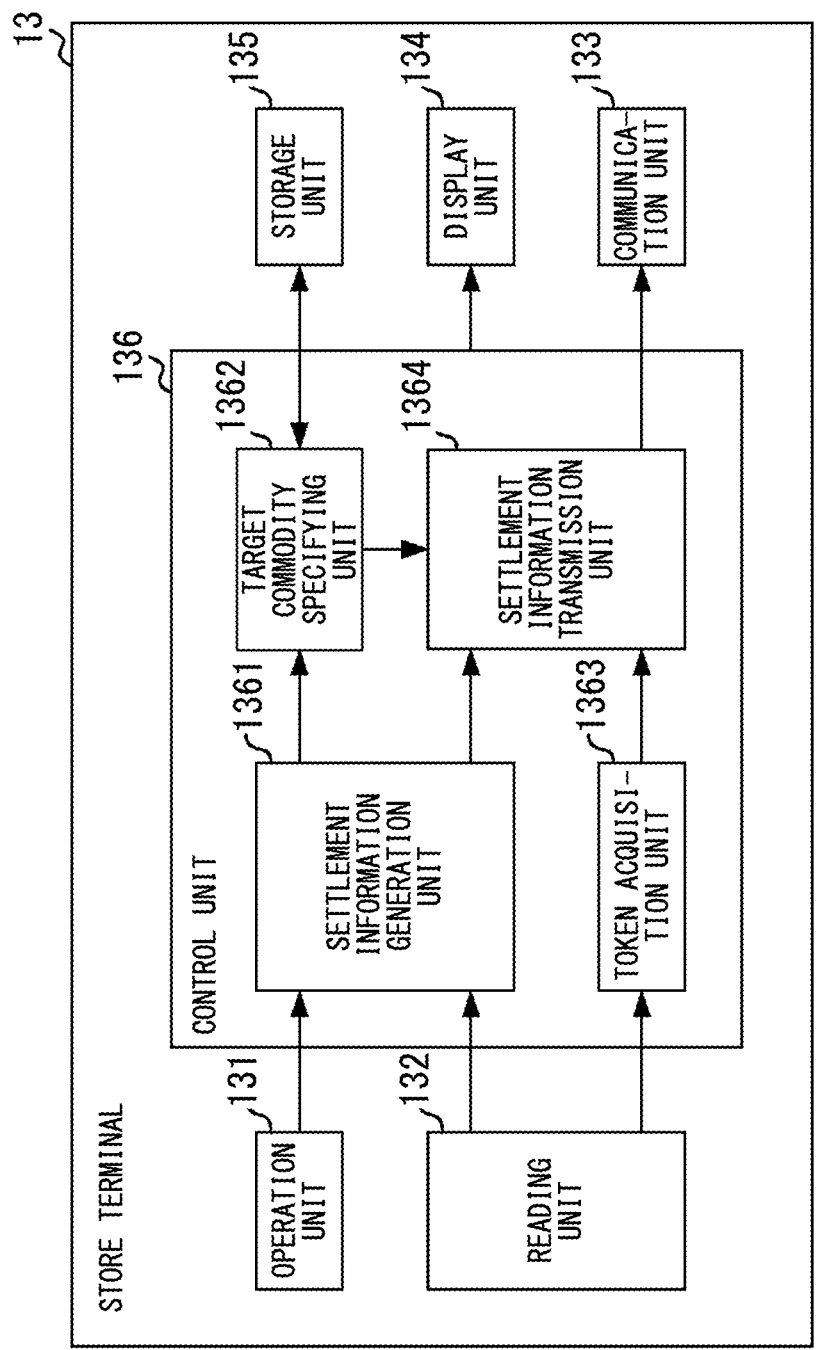
FIG. 4 is a block diagram illustrating a functional configuration of a store terminal according to the first embodiment.

FIG. 4 is a diagram illustrating a functional configuration of the store terminal 13. The store terminal 13 is, for example, a POS terminal and includes an operation unit 131, a reading unit 132, a communication unit 133, a display unit 134, a storage unit 135, and a control unit 136.

The operation unit 131 is an operation device that receives a user operation and is, for example, a button used for the user to select a commodity which the user will purchase or a touch panel provided on the surface of the display unit 134.

The reading unit 132 is, for example, a barcode reader and a camera and reads a barcode attached to a commodity purchased by the user or a settlement code displayed by the user terminal 12. The reading unit 132 outputs information indicated by the read barcode and settlement code to the control unit 136.

The communication unit 133 is, for example, a communication interface that transmits and receives data to and from the settlement device 11. The communication unit 133 transmits the settlement token, the settlement information, the privilege target commodity information, and the store ID to the settlement device 11 under the control of the control unit 136.

The display unit 134 is a display that displays various kinds of information. For example, the display unit 134 displays a settlement price.

The storage unit 135 is a storage medium including a ROM and a RAM. The storage unit 135 stores a program which is executed by the control unit 136. The storage unit 135 stores a program that cause the control unit 136 to function as a settlement information generation unit 1361, a target commodity specifying unit 1362, a token acquisition unit 1363, and a settlement information transmission unit 1364. The storage unit 135 stores a commodity DB in which commodity IDs are associated with the prices of commodities. The storage unit 135 stores the target commodity DB including the commodity ID indicating the target commodity.

The control unit 136 is, for example, a CPU and functions as the settlement information generation unit 1361, the target commodity specifying unit 1362, the token acquisition unit 1363, and the settlement information transmission unit 1364 by executing a program stored in the storage unit 135.

The settlement information generation unit 1361 specifies one or more commodities which are settlement targets and generates settlement information. Specifically, the settlement information generation unit 1361 specifies the commodities with the acquired commodity IDs as settlement target commodities by acquiring the commodity IDs input by a store staff member using the operation unit 131 or the commodity IDs read from barcodes attached to the commodities by the reading unit 132. The settlement information generation unit 1361 specifies the prices of the commodities associated with the acquired commodity IDs with reference to the commodity DB stored in the storage unit 135. The settlement information generation unit 1361 acquires one or more commodity IDs input by the store staff member using the operation unit 131 or one or more commodity IDs read from the barcodes attached to the commodities by the reading unit 132 and totals the prices of the specified commodities from the commodity IDs. The settlement information generation unit 1361 determines a total of the prices of the commodities as a settlement price when the operation unit 131 receives an adjustment operation. The settlement information generation unit 1361 generates settlement information including the determined settlement price.

The target commodity specifying unit 1362 generates the privilege target commodity information by specifying one or more target commodities among one or more commodities which are settlement targets. The privilege target commodity information is information for specifying a target commodity which is the privilege granting target among one or more commodities purchased by a user in a store in which the store terminal 13 is installed. The target commodity specifying unit 1362 specifies the commodity ID included in the target commodity DB stored in the storage unit 135 among the commodity IDs acquired by the settlement information generation unit 1361. The target commodity specifying unit 1362 specifies the commodity with the specified commodity ID as a target commodity and generates the specified commodity ID as the privilege target commodity information. The privilege target commodity information also includes a target commodity for which the user of the user terminal 12 does not apply for the privilege to be granted. The target commodity specifying unit 1362 does not generate the privilege target information when the commodity ID included in the target commodity DB stored in the storage unit 135 is not included in the commodity ID acquired by the settlement information generation unit 1361 and the target commodity cannot be specified.

The store terminal 13 transmits a sum (total price) of the prices of all the commodities which the user will purchase to the settlement device 11. However, when only the sum (total price) is received, the settlement device 11 cannot determine whether the target commodity is included in the commodities which the user will purchase. In this way, when the store terminal 13 transmits the privilege target commodity information to the settlement device 11, the settlement device 11 can determine whether the user purchases the commodity to which the privilege is granted. Therefore, the settlement device 11 can appropriately grant the privilege.

The token acquisition unit 1363 acquires information extracted from the settlement code as a settlement token when the reading unit 132 reads the settlement code displayed on the user terminal 12.

When the settlement information generation unit 1361 generates the settlement information, the target commodity specifying unit 1362 generates the privilege target commodity information, and the token acquisition unit 1363 acquires the settlement token, the settlement information transmission unit 1364 transmits the settlement token, the settlement information, the privilege target commodity information, and the store ID to the settlement device 11 via the communication unit 133. When the target commodity specifying unit 1362 does not generate the privilege target information, the settlement information transmission unit 1364 transmits the settlement token, the settlement information, and the store ID to the settlement device 11.

Operation of Each Unit of Control Unit 113

Next, an operation of each unit of the control unit 113 will be described.

The application reception unit 1131 receives a user ID and a use request from the user terminal 12 via the communication unit 111. The application reception unit 1131 notifies the token generation unit 1132 of the received user ID and use request.

The application reception unit 1131 receives an application to grant the privilege at the time of purchase of a target commodity from the user. Specifically, the application reception unit 1131 receives the application to grant the privilege by acquiring the user ID for specifying the user and application information indicating the application to grant the privilege at the time of the purchase of the target commodity from the user. The application information includes, for example, a store ID for identifying a store, a commodity ID for identifying a commodity, and content of the privilege.

Here, the application reception unit 1131 receives the application to grant the privilege by receiving the user ID and the application information from the user terminal 12. However, the present invention is not limited thereto. The application to grant the privilege may be received by receiving the user ID and the application information from another terminal used by the user. When the user ID and the application information are acquired, the application reception unit 1131 associates and stores the application information, the user ID, and an application date as application management information in the storage unit 112.

FIG. 5 is a table illustrating an example of application management information stored in the storage unit 112. As illustrated in FIG. 5, it can be confirmed that the user ID, the application date, and the application information can be associated in the application management information. One piece of application information may include a plurality of commodity IDs.

Here, when the user ID and the application information are received, the application reception unit 1131 may determine whether to receive the application to grant the privilege at a reception timing of the application information based on a predetermined condition. In the response to the reception determination of the application to grant the privilege, the application reception unit 1131 may associate and store the received application information and user ID as application management information in the storage unit 112.

The predetermined condition is that a reception order of the application information among a plurality of users is within a predetermined order. The application reception unit 1131 may determine whether to receive the application to grant the privilege based on a reception order of the application information from the user terminal 12. The predetermined condition may be wining of a lottery. The application reception unit 1131 may determine whether to receive the application to grant the privilege based on the lottery. In this way, the settlement device 11 may narrow down users whose applications are received at the time of application to grant the privilege.

The token generation unit 1132 receives the user ID and a request for acquiring the settlement code for settlement by the user of the user terminal 12 in the store from the user terminal 12. When the request for acquiring the settlement code is received, the token generation unit 1132 generates a settlement token for generating the settlement code. The token generation unit 1132 associates and stores the generated settlement token and the user ID in the storage unit 112. The token generation unit 1132 transmits the generated settlement token to the user terminal 12 that has transmitted the request for acquiring the settlement code.

The settlement information reception unit 1133 receives the settlement information used to perform settlement of one or more commodities, the settlement token, the privilege target commodity information for specifying one or more commodities which are privilege targets among one or more commodities, and the store ID from the store terminal 13 that reads the settlement code display by the user terminal 12 based on the settlement token.

When the settlement information reception unit 1133 receives the settlement token from the store terminal 13, the privilege granting unit 1134 determines whether the received settlement token is stored in the storage unit 112. When the privilege granting unit 1134 determines that the received settlement token is stored in the storage unit 112, the privilege granting unit 1134 specifies the application information associated with the user ID corresponding to the received settlement token and stored in the storage unit 112. Specifically, when the settlement token is received from the store terminal 13, the privilege granting unit 1134 specifies the user ID associated with the received settlement token with reference to the storage unit 112. Then, the privilege granting unit 1134 specifies application information associated with the specified user ID and the received store ID with reference to the application management information.

When the privilege target commodity information is received from the store terminal 13 and the specified application information corresponds to the privilege target commodity information, the privilege granting unit 1134 grants the privilege corresponding to the application information to the user. For example, when the commodity ID included in the specified application information is included in the received privilege target commodity information, the privilege granting unit 1134 determines that the application information corresponds to the privilege target commodity information received from the store terminal 13.

The privilege granting unit 1134 grants the privilege to the user based on the content of the privilege included in the application information corresponding to the privilege target commodity information. Here, a discount amount shown in the content of the privilege is subtracted from the settlement price indicated by the received settlement information.

For example, it is assumed that "i382," "i355," and "i900" are included as the privilege target commodity information and the commodity ID included in the specified application information is "i382." It is assumed that a total amount of the commodities bought during shopping in the store by the user is 3000 yen.

In this case, since the commodity ID "i382" included in the privilege target commodity information is also included in the specified application information, the privilege granting unit 1134 determines 2950 yen obtained by subtracting 50 yen from 3000 yen as a settlement price of the user based on the content of the privilege, i.e., amount of a discount "50 yen discount" associated with the commodity ID in the application management information.

When the commodity ID "i355" is not included in the specified application information, the specified application information does not correspond to the privilege target commodity information received from the store terminal 13 although the user purchases the commodity with the commodity ID "i355." Therefore, the privilege is not granted.

Here, the privilege granting unit 1134 may grant the privilege corresponding to the application information to the user when the received privilege target commodity information includes a plurality of commodities included in one piece of application information. For example, when the specified application information includes the plurality of commodity IDs and the received privilege target commodity information includes the plurality of commodity IDs, the privilege granting unit 1134 determines that the application information corresponds to the privilege target commodity information received from the store terminal 13 and grants the privilege to the user. In this way, the settlement device 11 can grant the privilege when the plurality of commodities corresponding to the application information are purchased simultaneously.

The privilege granting unit 1134 may grant the privilege corresponding to the application information based on the number of purchases of the target commodity of the user. In this case, the storage unit 112 stores purchase history information in which the commodity ID of the target commodity purchased by the user, the user ID of the user, and a purchase date of the target commodity are associated with each other. When the specified application information is determined to correspond to the privilege target commodity information, the privilege granting unit 1134 specifies the number of purchases of the target commodity included in the application information with reference to the purchase history information. The privilege granting unit 1134 grants the privilege corresponding to the application information when the number of purchases of the target commodity matches a pre-decided number of purchases.

The privilege granting unit 1134 may grant the privilege corresponding to the application information when the user purchases the target commodity corresponding to the application information for the first time. In this case, when it is determined that the specified application information corresponds to the privilege target commodity information, the privilege granting unit 1134 specifies whether the target commodity included in the application information has been purchased in the past with reference to the purchase history information. When the target commodity which has not been purchased in the past is specified, the privilege granting unit 1134 grants the privilege corresponding to the application information. In this way, the settlement device 11 can grant the privilege as a first purchase of the target commodity as a condition.

The privilege granting unit 1134 may grant the privilege corresponding to the application information based on a reception order of the application information. In this case, when it is determined that the specified application information corresponds to the privilege target commodity information, the privilege granting unit 1134 specifies an order in which the user makes an application to grant the privilege with reference to the application management information stored in the storage unit 112 and with reference to an application date of the application information of each of all the users including the user. When the order in which the user applies for the privilege to be granted is within a pre-decided order, the privilege granting unit 1134 grants the privilege corresponding to the application information. In this way, the user can make an application to grant the privilege sooner.

The privilege granting unit 1134 may grant the privilege corresponding to the application information based on a lottery. In this case, when it is determined that the specified application information corresponds to the privilege target commodity information, the privilege granting unit 1134 performs the lottery and determines whether the user wins the lottery. When the privilege granting unit 1134 determines that the user wins the lottery, the privilege granting unit 1134 grants the privilege corresponding to the application information. In this way, it is possible to restrict the user to which the privilege is granted and reduce cost related to the granting of the privilege on a side supplying the privilege.

The settlement unit 1135 performs the settlement based on the store ID received from the store terminal 13, the user ID associated with the received settlement token, and the settlement price determined by the privilege granting unit 1134. For example, the settlement unit 1135 specifies the user ID associated with the settlement token and stored in the storage unit 112 and performs a process of withdrawing a settlement price from an account of the user specified with the user ID. The settlement unit 1135 may perform a process of depositing the settlement price into an account of the store specified with the received store ID. The settlement unit 1135 may deposit an amount obtained by deducting a settlement fee from the settlement price in the settlement device 11 into the account of the store. When the settlement of the settlement price is completed, the settlement unit 1135 notifies the user terminal 12 and the store terminal 13 that the payment is completed. The settlement unit 1135 notifies the user terminal 12 of information indicating that the privilege is granted to the user by the privilege granting unit 1134 and notifies the user terminal 12 of information indicating a discount amount as information indicating the privilege granted to the user.

Operation Sequence

Figure 6:
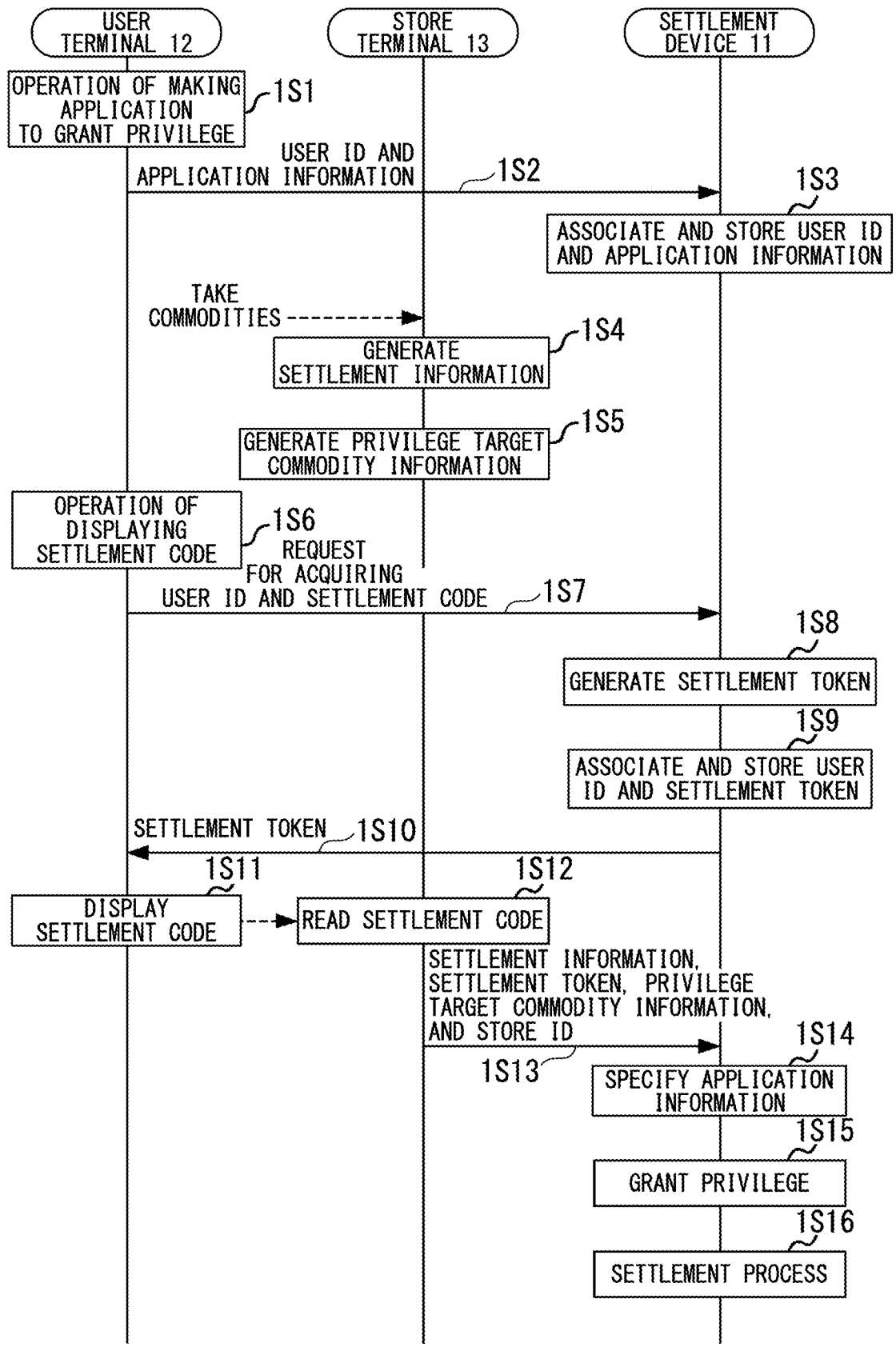
FIG. 6 is a sequence diagram illustrating a privilege granting operation in the settlement system according to the first embodiment.

FIG. 6 is a sequence diagram illustrating an operation in the settlement system 1S.

The sequence diagram illustrated in FIG. 6 starts from the time at which the user performs an operation of making an application to grant the privilege in the user terminal 12 (1S1). When the user performs the operation of making an application to grant the privilege, the request transmission unit 1252 of the user terminal 12 transmits the user ID and the application information to the settlement device 11 (1S2).

When the user ID and the application information are received, the application reception unit 1131 of the settlement device 11 associates and stores the user ID, the application information, and the application date as the application management information in the storage unit 112 (1S3).

In the store, the user selects the commodities which the user will purchase and takes the selected commodities to a store staff member using the store terminal 13. The settlement information generation unit 1361 of the store terminal 13 calculates a settlement price by acquiring the commodity ID input by the store staff member using the operation unit 131 or the commodity ID read from the barcode attached to the commodity by the reading unit 132 and specifying the price of the commodity associated with the commodity ID. The settlement information generation unit 1361 generates the settlement information including the settlement price (1S4). The target commodity specifying unit 1362 of the store terminal 13 generates the privilege target commodity information by specifying one or more target commodities among one or more commodities which are settlement targets (1S5).

On the other hand, when the user performs an operation of displaying the settlement code using the user terminal 12 (1S6), the request transmission unit 1252 transmits a request for acquiring the user ID and the settlement code to the settlement device 11 (1S7).

When the request for acquiring the user ID and the settlement code is acquired, the token generation unit 1132 of the settlement device 11 generates the settlement token for generating the settlement code (1S8). The token generation unit 1132 associates and stores the generated settlement token and the user ID in the storage unit 112 (1S9). The token generation unit 1132 transmits the generated settlement token to the user terminal 12 which has transmitted the request for acquiring the settlement code (1S10).

The code generation unit 1253 of the user terminal 12 generates the settlement code based on the settlement token received from the settlement device 11 and displays the generated settlement code on the display unit 123 (1S11). When the user presents the settlement code displayed on the user terminal 12 in the store, the reading unit 132 of the store terminal 13 reads the settlement code (1S12). The settlement information transmission unit 1364 of the store terminal 13 transmits the settlement information generated in 1S4, the privilege target commodity information generated in 1S5, the store ID, and the settlement token included in the settlement code read in 1S12 to the settlement device 11 (1S13).

When the settlement information reception unit 1133 receives the settlement information, the privilege target commodity information, the store ID, and the settlement token from the store terminal 13, the privilege granting unit 1134 specifies the application information associated with the user ID corresponding to the received settlement token and stored in the storage unit 112 (1S14). Then, when the specified application information includes the received store ID and the specified application information corresponds to the privilege target commodity information received from the store terminal 13, the privilege granting unit 1134 grants the privilege corresponding to the application information to the user (1S15). Here, a discount from the settlement price is given as the privilege.

Subsequently, the settlement unit 1135 performs the settlement based on the received store ID, the user ID associated with the settlement token, and the settlement price determined by the privilege granting unit 1134 (1S16).

Advantages in Settlement System 1S

As described above, the settlement device 11 associates and stores the user ID and the application information in the storage unit 112 when the user ID and the application information indicating an application to grant the privilege at the time of purchase of the target commodity are acquired. The settlement device 11 generates the user ID and the settlement token by receiving the request for acquiring the settlement code from the user terminal 12, and transmits the generated settlement token to the user terminal 12. The user terminal 12 generates the settlement code based on the received settlement token. When the settlement information used to perform settlement of one or more commodities, the settlement token, and the privilege target commodity information for specifying one or more privilege target commodities among one or more commodities are received from the store terminal 13 reading the settlement code displayed by the user terminal 12 based on the settlement token, the settlement device 11 specifies the application information associated with the user identifier corresponding to the settlement token and stored in the storage unit 112. When the specified application information corresponds to the received privilege target commodity information, the settlement device 11 grants the privilege corresponding to the application information to the user. In this way, the store staff member in the store can perform an adjustment process by merely reading the settlement code and the user of the user terminal 12 can receive the discount as the privilege at the time of settlement. Therefore, the settlement process for electronic settlement involving the granting of the privilege can be simplified.

Overview of Settlement System 2S

Figure 7:
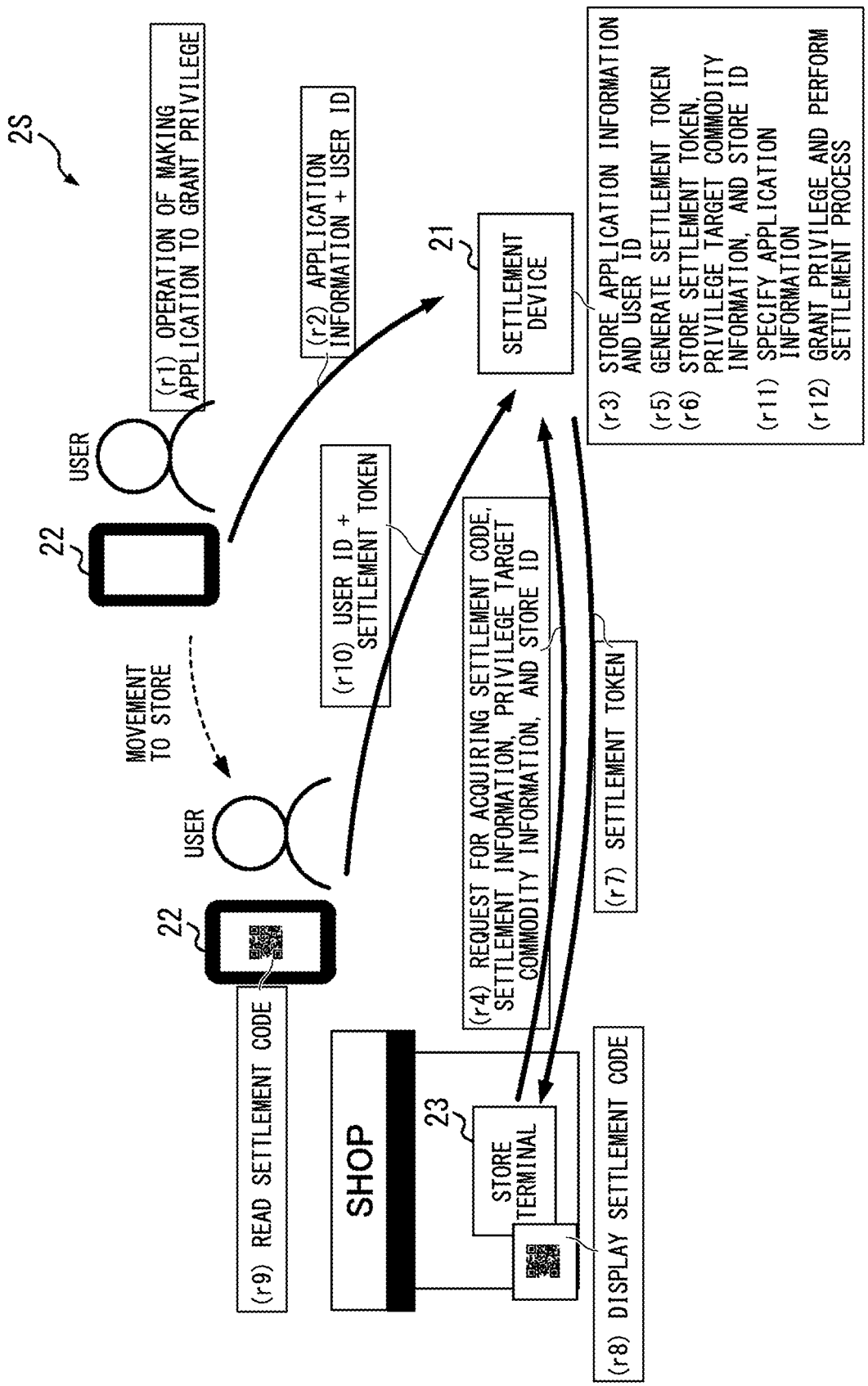
FIG. 7 is a diagram illustrating an overview of a settlement system according to the second embodiment of the present invention.

FIG. 7 is a diagram illustrating an overview of a settlement system 2S according to a second embodiment of the present invention. The settlement system 2S includes a settlement device 21, a user terminal 22, and a store terminal 23. The settlement system 2S is a system that displays a settlement code on the store terminal 23 in response to a request from the store terminal 23 and performs settlement in response to a case in which the settlement device 21 specifies that a settlement code is read with the user terminal 22 when the user purchases commodities in a store. The settlement system 2S functions as a privilege granting system that grants a privilege such as a discount (reducing a payment amount), issuance of a coupon, and so on, to the user at the time of settlement. The settlement code is text or an image read in the user terminal 22 and is a code used at the time of settlement.

The settlement device 21 is a server that performs settlement of a purchase price. The settlement device 21 also functions as a privilege granting device that grants the privilege to a user. In the embodiment, the privilege is granted in response to purchase of a specific commodity by a user. In the following description, a specific commodity to which the privilege is granted is referred to as a target commodity.

The user terminal 22 is an information terminal that is used by the user and is, for example, a smartphone, a tablet, or a personal computer. A commodity seller that provides the privilege provides information regarding granting of the privilege to the user terminal 22 using an advertisement delivery function via the Internet.

A privilege is granted to the user at the time of purchase of a target commodity when the user makes an application to grant the privilege in advance. Hereinafter, a flow until settlement of the price of a commodity and granting of the privilege will be described with reference to FIG. 7.

The user performs an operation of making an application to grant the privilege in the user terminal 22 ((r1) in FIG. 7). For example, when the user activates application software for settlement and inputs a user ID as a user identifier for identifying the user, the user terminal 22 transmits the user ID to a settlement service provider and logs into an application. Then, the user terminal 22 inquires of a server of the settlement service provider about the privilege for which the user can apply.

The server of the settlement service provider associates and stores a privilege ID for identifying the privilege, content of the privilege, a commodity ID serving as commodity identification information for identifying a target commodity, and a commodity name. The server of the settlement service provider reads the privilege ID of the privilege for which the user can apply from a storage medium (for example, a hard disk) and transmits the content of the privilege corresponding to the read privilege ID, the commodity ID, and the commodity name to the user terminal 22.

The user terminal 22 displays the received content of the privilege, commodity ID, and commodity name. When the user performs an operation of selecting the privilege to make the application, the user terminal 22 transmits application information indicating an application to grant the selected privilege and the user ID to the settlement device 21 ((r2) in FIG. 7). The application information includes, for example, store ID for identifying a store, commodity ID of target commodity, and content of the privilege. When the application information and the user ID are received, the settlement device 21 associates and stores the application information and the user ID ((r3) in FIG. 7).

Thereafter, the user moves to a store and purchases commodities including target commodities in the store. When a user performs accounting in the store, a store staff member in the store reads barcodes attached to commodities that are purchase targets using the store terminal 23 and causes the store terminal 23 to generate settlement information indicating a total amount of commodities which the user will purchase and privilege target commodity information for specifying the target commodities. The privilege target commodity information is information for specifying the target commodities to which the privilege is granted among the commodities which the user will purchase in the store and includes commodity IDs of the target commodities.

The store staff member performs an operation of displaying the settlement code on the store terminal 23 using the store terminal 23. The store terminal 23 transmits a request for acquiring the settlement code, the settlement information, the store ID for identifying the store, and the privilege target commodity information to the settlement device 21 ((r4) in FIG. 7).

When the request for acquiring the settlement code, the settlement information, the privilege target commodity information, and the store ID are received from the store terminal 23, the settlement device 21 generates a settlement token ((r5) in FIG. 7). The settlement token is a data string used for the store terminal 23 to generate a settlement code presented to the user by the store terminal 23. Here, the settlement token may be generated only in the case of a specific store specified with the store ID. The settlement device 21 associates and stores the generated settlement token, the privilege target commodity information, and the store ID in a storage medium ((r6) in FIG. 7).

The settlement device 21 transmits the generated settlement token to the store terminal 23 ((r7) in FIG. 7). After the settlement token is encrypted, the settlement device 21 may transmit the encrypted settlement token to the store terminal 23.

The store terminal 23 generates and displays the settlement code on the basis of the received settlement token ((r8) in FIG. 7).

For example, the user terminal 22 reads the settlement code displayed on the store terminal 23 through an operation by a user ((r9) in FIG. 7). The user terminal 22 transmits the user ID and the settlement token indicated by the read settlement code to the settlement device 21 ((r10) in FIG. 7).

When the user ID and the settlement token are received from the user terminal 22, the settlement device 21 specifies the application information stored in association with the received user ID ((r11) in FIG. 7). The settlement device 21 determines whether the received settlement token matches the settlement token transmitted to the store. When the settlement device 21 determines that the settlement tokens match each other, the settlement device 21 specifies the privilege target commodity information stored in association with the settlement token. When the commodity ID of the target commodity included in the specified application information is included in the commodity ID of the target commodity included in the specified privilege target commodity information, the settlement device 21 grants the privilege to the user by determining a price which is obtained after subtraction of a discount amount from the settlement price indicated by the settlement information received from the store terminal 23 and is the privilege corresponding to the specified application information as a settlement price of the user and performs the settlement process based on the settlement price ((r12) in FIG. 7).

The settlement device 21 does not perform settlement when the settlement tokens do not match each other. When the commodity IDs of the target commodities included in the application information are not included in the commodity IDs of the target commodities included in the specified privilege target commodity information, the settlement device 21 performs the settlement process without granting the privilege. When the settlement process ends, the settlement device 21 notifies at least one of the user terminal 22 and the store terminal 23 of the end of the settlement process and a result obtained by applying the privilege.

When the user merely applies for the privilege to be granted in advance and subsequently performs a normal process of reading the settlement code displayed on the store terminal 23 and performing settlement using the user terminal 22 at the time of purchase of the commodities including the target commodities, the settlement system 2S can operate the above operation to grant the privilege based on the purchase of the target commodity at the time of settlement.

Hereinafter, the details of the configurations of the settlement device 21, the user terminal 22, and the store terminal 23 will be described. In the following description, a case in which the content of the privilege is a discount of a price of a commodity will be described as an example.

Functional Configuration of Settlement Device 21

Figure 8:
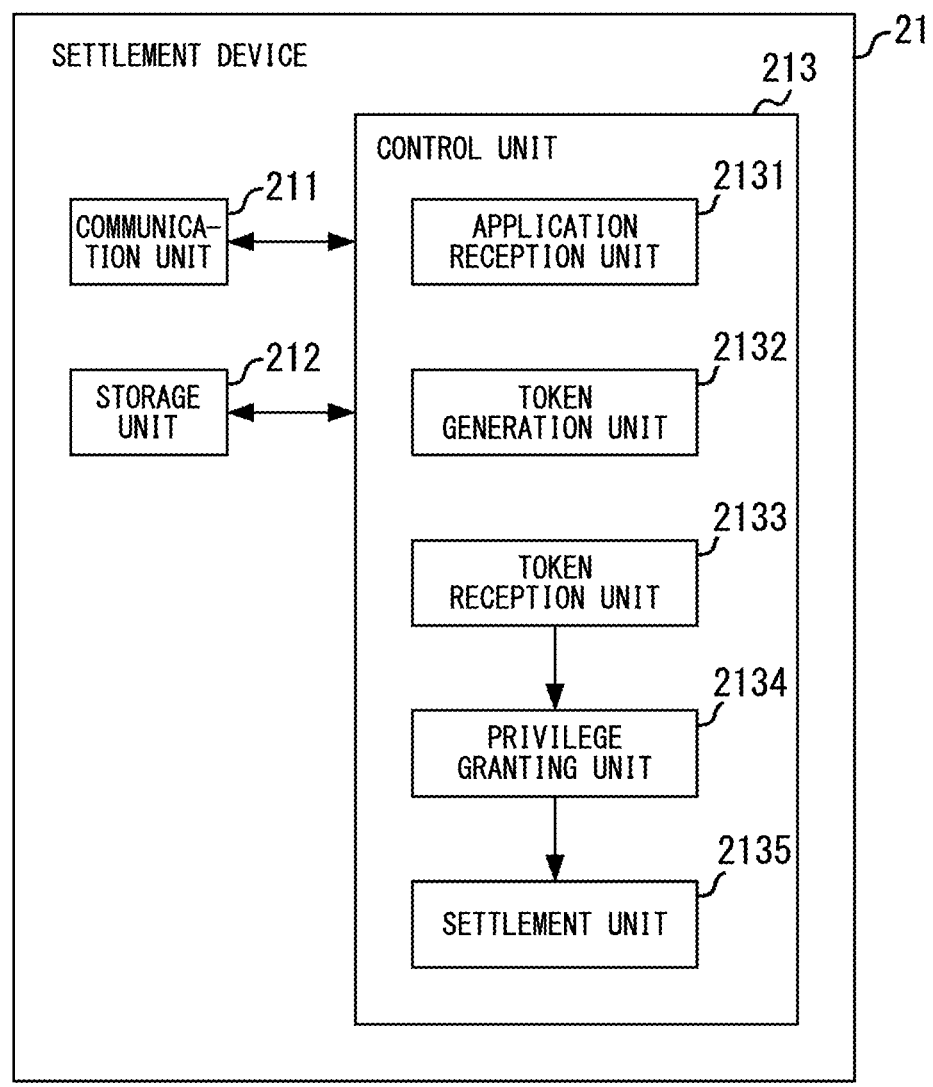
FIG. 8 is a block diagram illustrating a functional configuration of a settlement device according to the second embodiment.

FIG. 8 is a block diagram illustrating a functional configuration of the settlement device 21. The settlement device 21 includes a communication unit 211, a storage unit 212, and a control unit 213.

The communication unit 211 is a communication interface that transmits and receives data to and from the user terminal 22 and the store terminal 23 via a network such as the Internet.

The storage unit 212 is a storage medium that stores various kinds of data and includes a read-only memory (ROM), a random access memory (RAM), and a hard disk. The storage unit 212 stores a program that is executed by the control unit 213. The storage unit 212 stores a settlement program causing the control unit 213 to function as an application reception unit 2131, a token generation unit 2132, a token reception unit 2133, a privilege granting unit 2134, and a settlement unit 2135.

The storage unit 212 associates and stores application information acquired from the user terminal 22 and the user ID. The storage unit 212 associates and stores the settlement token generated by the control unit 213 and the privilege target commodity information.

The control unit 213 is, for example, a central processing unit (CPU). The control unit 213 functions as the application reception unit 2131, the token generation unit 2132, the token reception unit 2133, the privilege granting unit 2134, and the settlement unit 2135 by executing the settlement program stored in the storage unit 212. The details of an operation of each unit of the control unit 213 will be described below.

Functional Configuration of User Terminal 22

Figure 9:
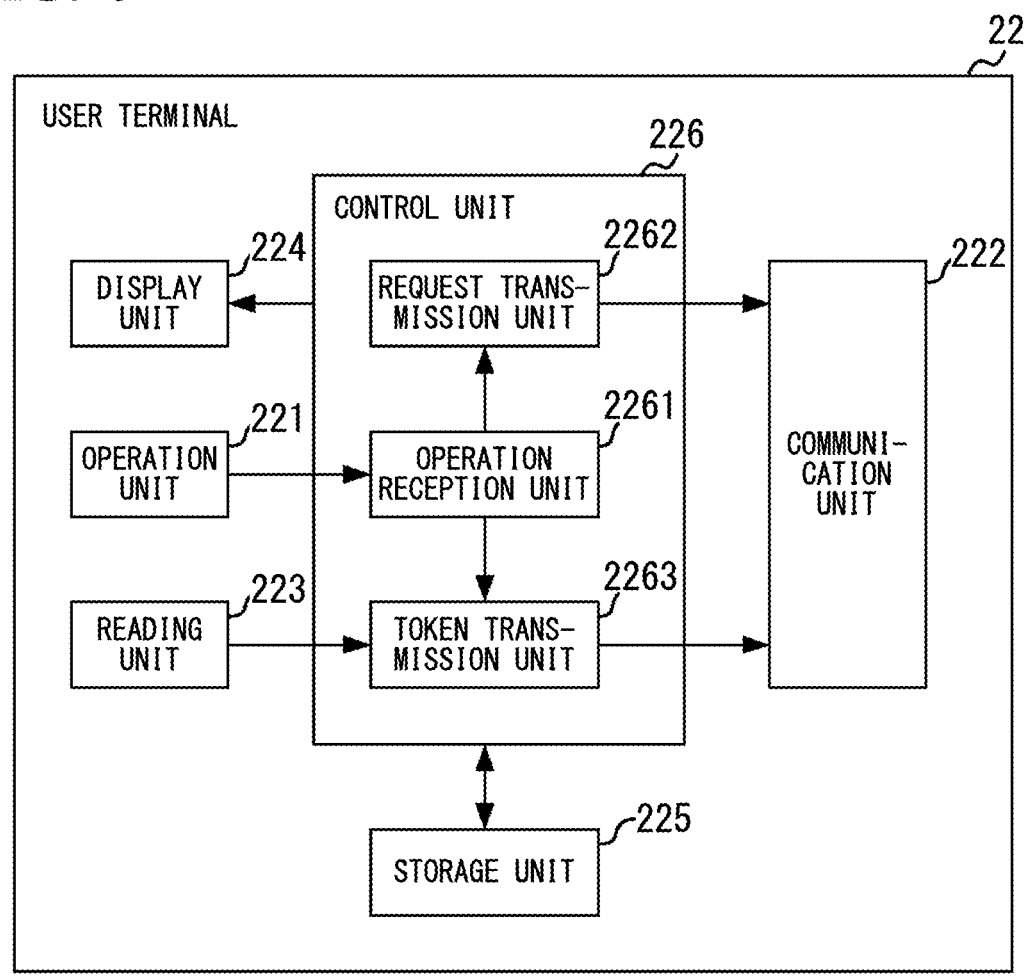
FIG. 9 is a block diagram illustrating a functional configuration of a user terminal according to the second embodiment.

FIG. 9 is a diagram illustrating a functional configuration of the user terminal 22. The user terminal 22 includes an operation unit 221, a communication unit 222, a reading unit 223, a display unit 224, a storage unit 225, and a control unit 226. The control unit 226 includes an operation reception unit 2261, a request transmission unit 2262, and a token transmission unit 2263.

The operation unit 221 is an operation device that receives a user operation and is, for example, a touch panel provided on the surface of the display unit 224. The operation unit 221 notifies the operation reception unit 2261 of a signal indicating a position touched by the user.

The communication unit 222 is a wireless communication interface that transmits and receives data to and from, for example, a base station of a mobile phone network. The communication unit 222 transmits application information input from the request transmission unit 2262 to the settlement device 21. The communication unit 222 transmits the acquired settlement token or the like to the settlement device 21.

The reading unit 223 is, for example, a camera. The reading unit 223 reads the settlement code displayed on the store terminal 23.

The display unit 224 is a display that displays various kinds of information.

The storage unit 225 is a storage medium including a ROM and a RAM. The storage unit 225 stores a program which is executed by the control unit 226. The storage unit 225 stores a program that causes the control unit 226 to function as the operation reception unit 2261, the request transmission unit 2262, and the token transmission unit 2263.

The control unit 226 is, for example, a CPU and functions as the operation reception unit 2261, the request transmission unit 2262, and the token transmission unit 2263 by executing a program stored in the storage unit 225.

The operation reception unit 2261 specifies operation content of the user based on the signal input from the operation unit 221. The operation reception unit 2261 notifies the request transmission unit 2262 of the operation content when the specified operation content is an operation of making an application to grant the privilege. When the operation reception unit 2261 receives the operation of making the application to grant the privilege, the request transmission unit 2262 transmits the user ID and the application information to the settlement device 21 via the communication unit 222.

When the specific operation content is an operation of reading the settlement code, the operation reception unit 2261 notifies the token transmission unit 2263 of the operation content.

When the operation reception unit 2261 receives an operation of reading the settlement code, the token transmission unit 2263 causes the reading unit 223 to read the settlement code displayed on the store terminal 23. The token transmission unit 2263 acquires information extracted from the settlement code by the reading unit 223 as the settlement token. The token transmission unit 2263 transmits the acquired settlement token and the user ID to the settlement device 21 via the communication unit 222.

Functional Configuration of Store Terminal 23

Figure 10:
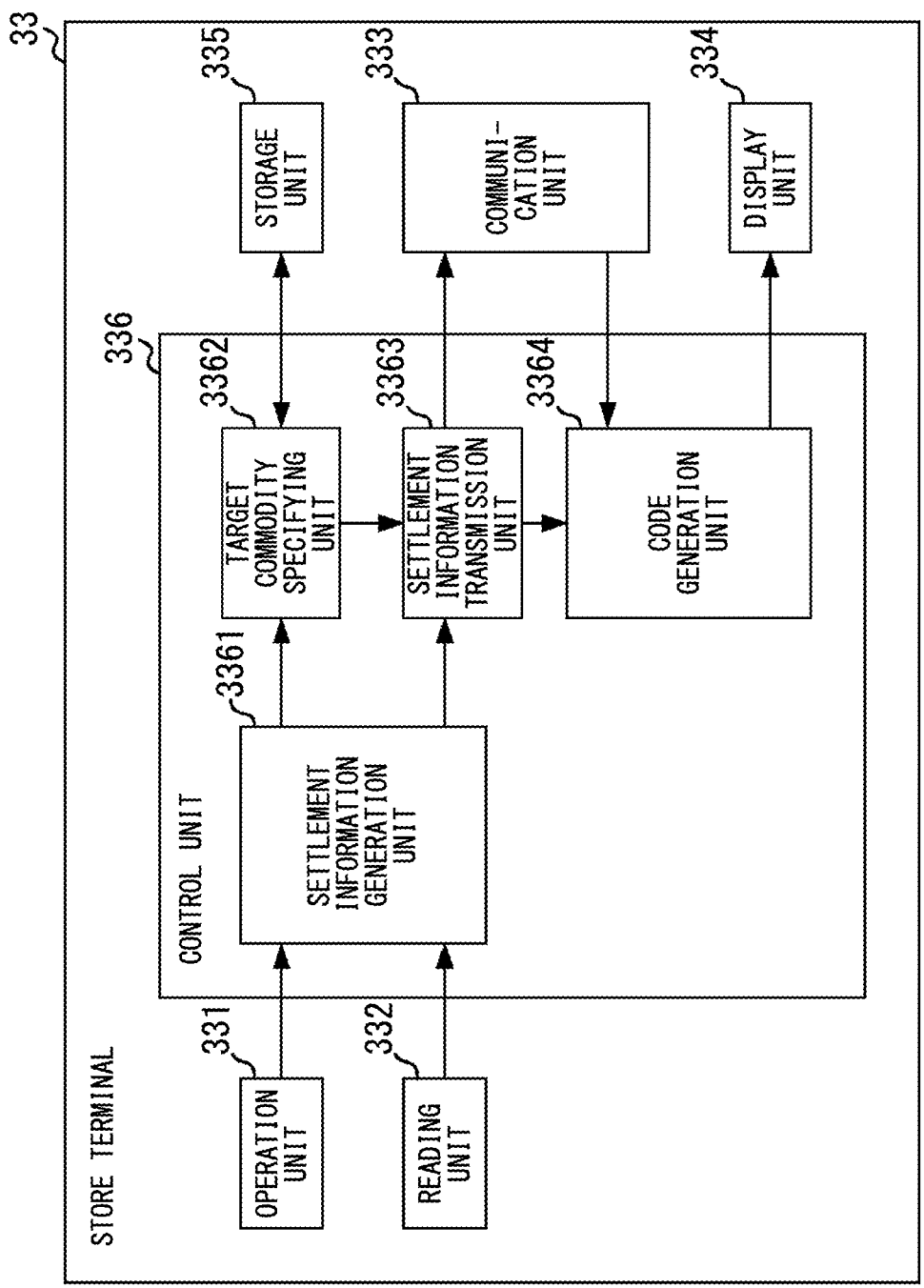
FIG. 10 is a block diagram illustrating a functional configuration of a store terminal according to the second embodiment.

FIG. 10 is a diagram illustrating a functional configuration of the store terminal 23. The store terminal 23 is, for example, a POS terminal and includes an operation unit 231, a reading unit 232, a communication unit 233, a display unit 234, a storage unit 235, and a control unit 236.

The operation unit 231 is an operation device that receives a user operation and is, for example, a button used for the user to select a commodity which the user will purchase or a touch panel provided on the surface of the display unit 234.

The reading unit 232 is, for example, a barcode reader and reads a barcode attached to a commodity purchased by the user. The reading unit 232 outputs information indicated by the read barcode to the control unit 236.

The communication unit 233 is, for example, a communication interface that transmits and receives data to and from the settlement device 21. The communication unit 233 transmits a request for acquiring the settlement code, the settlement information, the privilege target commodity information, and the store ID to the settlement device 21 under the control of the control unit 236. The communication unit 233 receives the settlement token from the settlement device 21.

The display unit 234 is a display that displays various kinds of information. For example, the display unit 234 displays a settlement price or the settlement code.

The storage unit 235 is a storage medium including a ROM and a RAM. The storage unit 235 stores a program which is executed by the control unit 236. The storage unit 235 stores a program that causes the control unit 236 to function as a settlement information generation unit 2361, a target commodity specifying unit 2362, a settlement information transmission unit 2363, and a code generation unit 2364. The storage unit 235 stores a commodity DB in which commodity IDs are associated with the prices of commodities. The storage unit 235 stores the target commodity DB including the commodity ID indicating the target commodity.

The control unit 236 is, for example, a CPU and functions as the settlement information generation unit 2361, the target commodity specifying unit 2362, the settlement information transmission unit 2363, and the code generation unit 2364 by executing a program stored in the storage unit 235.

The settlement information generation unit 2361 specifies one or more commodities which are settlement targets and generates settlement information. Specifically, the settlement information generation unit 2361 specifies the commodities with the acquired commodity IDs as settlement target commodities by acquiring the commodity IDs input by the store staff member using the operation unit 231 or the commodity IDs read from barcodes attached to the commodities by the reading unit 232. The settlement information generation unit 2361 specifies the prices of the commodities associated with the acquired commodity IDs with reference to the commodity DB stored in the storage unit 235. The settlement information generation unit 2361 acquires one or more commodity IDs input by the store staff member using the operation unit 231 or one or more commodity IDs read from the barcodes attached to the commodities by the reading unit 232 and totals the prices of the specified commodities from the commodity IDs. The settlement information generation unit 2361 determines a total of the prices of the commodities as a settlement price when the operation unit 231 receives an adjustment operation. The settlement information generation unit 2361 generates settlement information including the determined settlement price.

The target commodity specifying unit 2362 generates the privilege target commodity information by specifying one or more target commodities among one or more commodities which are settlement targets. The privilege target commodity information is information for specifying a target commodity which is a privilege granting target among one or more commodities purchased by a user in a store in which the store terminal 23 is installed. The target commodity specifying unit 2362 specifies the commodity ID included in the target commodity DB stored in the storage unit 235 among the commodity IDs acquired by the settlement information generation unit 2361. The target commodity specifying unit 2362 specifies the commodity with the specified commodity ID as a target commodity and generates the specified commodity ID as the privilege target commodity information. The privilege target commodity information also includes a target commodity for which the user of the user terminal 22 does not apply for the privilege to be granted. The target commodity specifying unit 2362 does not generate the privilege target information when the commodity ID included in the target commodity DB stored in the storage unit 235 is not included in the commodity ID acquired by the settlement information generation unit 2361 and the target commodity cannot be specified.

The store terminal 23 transmits a sum (total price) of the prices of all the commodities which the user will purchase to the settlement device 21. However, when only the sum (total price) is received, the settlement device 21 cannot determine whether the target commodity is included in the commodities which the user will purchase. In this way, when the store terminal 23 transmits the privilege target commodity information to the settlement device 21, the settlement device 21 can determine whether the user purchases the commodity to which the privilege is granted. Therefore, the settlement device 21 can appropriately grant the privilege.

When the settlement information generation unit 2361 generates the settlement information and the target commodity specifying unit 2362 generates the privilege target commodity information, the settlement information transmission unit 2363 transmits a request for acquiring the settlement code, the settlement information, the privilege target commodity information, and the store ID to the settlement device 21 via the communication unit 233. When the target commodity specifying unit 2362 does not generate the privilege target information, the settlement information transmission unit 2363 transmits the request for acquiring the settlement code, the settlement information, and the store ID to the settlement device 21.

When the settlement token is transmitted from the settlement device 21, the code generation unit 2364 generates the settlement code based on the settlement token. For example, the code generation unit 2364 generates the settlement code based on a pre-decided rule. The code generation unit 2364 displays the generated settlement code on the display unit 234.

Operation of Each Unit of Control Unit 213

Next, an operation of each unit of the control unit 213 will be described.

The application reception unit 2131 receives a user ID and a use request from the user terminal 22 via the communication unit 211. The application reception unit 2131 notifies the token generation unit 2132 of the received user ID and use request.

The application reception unit 2131 receives an application to grant the privilege at the time of purchase of a target commodity from the user. Specifically, the application reception unit 2131 receives the application to grant the privilege by acquiring the user ID for specifying the user and application information indicating the application to grant the privilege at the time of the purchase of the target commodity from the user. The application information includes, for example, a store ID for identifying a store, a commodity ID for identifying a commodity, and content of the privilege.

Here, the application reception unit 2131 receives the application to grant the privilege by receiving the user ID and the application information from the user terminal 22. However, the present invention is not limited thereto. The application to grant the privilege may be received by receiving the user ID and the application information from another terminal used by the user. When the user ID and the application information are acquired, the application reception unit 2131 associates and stores the application information, the user ID, and an application date as application management information in the storage unit 212.

The application management information stored in the storage unit 212 is the same as the application management information stored in the storage unit 112 in the first embodiment. That is, as illustrated in FIG. 5, the storage unit 212 stores the application management information. It can be confirmed that the user ID, the application date, and the application information can be associated in the application management information. One piece of application information may include a plurality of commodity IDs.

Here, when the user ID and the application information are received, the application reception unit 2131 may determine whether to receive the application to grant the privilege at a reception timing of the application information based on a predetermined condition. In the response to the reception determination of the application to grant the privilege, the application reception unit 2131 may associate and store the received application information and user ID as application management information in the storage unit 212.

The predetermined condition is that a reception order of the application information among a plurality of users is within a predetermined order. The application reception unit 2131 may determine whether to receive the application to grant the privilege based on a reception order of the application information from the user terminal 22. The predetermined condition may be a win of a lottery. The application reception unit 2131 may determine whether to receive the application to grant the privilege based on the lottery. In this way, the settlement device 21 may narrow down users whose applications are received at the time of application to grant the privilege.

When the settlement information, the privilege target commodity information, and the store ID are received and the request for acquiring the settlement code is received from the store terminal 23, the token generation unit 2132 generates the settlement token for generating the settlement code. The token generation unit 2132 associates and stores the generated settlement token, the settlement information, the privilege target commodity information, and the store ID in the storage unit 212. The token generation unit 2132 transmits the generated settlement token to the store terminal 23 which has transmitted the request for acquiring the settlement code. The token generation unit 2132 receives the settlement information, the privilege target commodity information, and the store ID and receives the request for acquiring the settlement code from the store terminal 23, but a timing at which the settlement information, the privilege target commodity information and the store ID are received may be different from a timing at which the request for acquiring the settlement code is received. The token generation unit 2132 may generate the settlement token only when the store indicated with the store ID is a specific store.

The token reception unit 2133 receives the settlement token and the user ID from the user terminal 22 reading the settlement code displayed on the store terminal 23 based on the settlement token. The token reception unit 2133 receives the settlement token and the user ID and also the store ID from the user terminal 22. For example, the store terminal 23 displays the store ID or the code indicating the store ID, and the user terminal 22 reads the store ID or the code, extracts the store ID from the code, and transmits the store ID to the settlement device 21.

When the token reception unit 2133 receives the settlement token and the user ID from the user terminal 22, the privilege granting unit 2134 determines whether the received settlement token is stored in the storage unit 212. When the privilege granting unit 2134 determines that the received settlement token is stored in the storage unit 212, the privilege granting unit 2134 specifies the application information associated with the received user ID and stored in the storage unit 212. When the privilege granting unit 2134 determines that the received settlement token is stored in the storage unit 212, the privilege granting unit 2134 specifies the privilege target commodity information associated with the received settlement token and stored in the storage unit 212.

When the privilege granting unit 2134 can specify the privilege target commodity information and the specified application information corresponds to the privilege target commodity information, the privilege granting unit 2134 grants the privilege corresponding to the application information to the user. For example, when the commodity ID included in the specified application information is included in the specified privilege target commodity information, the privilege granting unit 2134 determines that the application information corresponds to the privilege target commodity information.

The privilege granting unit 2134 grants the privilege to the user based on the content of the privilege included in the application information corresponding to the privilege target commodity information. Here, a discount amount shown in the content of the privilege is subtracted from the settlement price indicated by the settlement information stored in association with the settlement token.

For example, it is assumed that "i382," "i355," and "i900" are included as the privilege target commodity information and the commodity ID included in the specified application information is "i382." It is assumed that a total amount of the commodities selected in the store by the user is 3000 yen.

In this case, since the commodity ID "i382" included in the privilege target commodity information is also included in the specified application information, the privilege granting unit 2134 determines 2950 yen obtained by subtracting 50 yen from 3000 yen as a settlement price of the user based on the content of the privilege, i.e., amount of a discount "50 yen discount" associated with the commodity ID in the application management information.

When the commodity ID "i355" is not included in the specified application information, the specified application information does not correspond to the privilege target commodity information received from the store terminal 23 although the user purchases the commodity with the commodity ID "i355." Therefore, the privilege is not granted.

Here, when the privilege granting unit 2134 determines that the application information corresponds to the privilege target commodity information and determines that the store ID included in the specified application information matches the store ID stored in association with the settlement token, the privilege granting unit 2134 may grant the privilege to the user. When the store ID is received from the user terminal 22, and the privilege granting unit 2134 may determine that the application information corresponds to the privilege target commodity information and may grant the privilege to the user in accordance with the matching between the received store ID and the store ID included in the application information. In this way, it is possible to grant the privilege when the user purchases the target commodity in a specific store.

When the specified privilege target commodity information includes a plurality of commodities included in one piece of application information, the privilege granting unit 2134 may grant the privilege corresponding to the application information to the user. For example, when the specified application information includes a plurality of commodity IDs and the specified privilege target commodity information includes the plurality of commodity IDs, the privilege granting unit 2134 determines that the application information corresponds to the privilege target commodity information and grants the privilege to the user. In this way, the settlement device 21 can grant the privilege when the plurality of commodities corresponding to the application information are purchased simultaneously.

The privilege granting unit 2134 may grant the privilege corresponding to the application information based on the number of purchases of the target commodity of the user. In this case, the storage unit 212 stores purchase history information in which the commodity ID of the target commodity purchased by the user, the user ID of the user, and a purchase date of the target commodity are associated with each other. When the specified application information is determined to correspond to the privilege target commodity information, the privilege granting unit 2134 specifies the number of purchases of the target commodity included in the application information with reference to the purchase history information. The privilege granting unit 2134 grants the privilege corresponding to the application information when the number of purchases of the target commodity matches a pre-decided number of purchases.

The privilege granting unit 2134 may grant the privilege corresponding to the application information when the user purchases the target commodity corresponding to the application information for the first time. In this case, when it is determined that the specified application information corresponds to the privilege target commodity information, the privilege granting unit 2134 specifies whether the target commodity included in the application information was purchased in the past with reference to the purchase history information. When the target commodity which has not been purchased in the past is specified, the privilege granting unit 2134 grants the privilege corresponding to the application information. In this way, the settlement device 21 can grant the privilege as a first purchase of the target commodity as a condition.

The privilege granting unit 2134 may grant the privilege corresponding to the application information based on a reception order of the application information. In this case, when it is determined that the specified application information corresponds to the privilege target commodity information, the privilege granting unit 2134 specifies an order in which the user makes an application to grant the privilege with reference to the application management information stored in the storage unit 212 and with reference to an application date of the application information of each of all the users including the user. When the order in which the user applies for the privilege to be granted is within a pre-decided order, the privilege granting unit 2134 grants the privilege corresponding to the application information. In this way, the user can make an application to grant the privilege early.

The privilege granting unit 2134 may grant the privilege corresponding to the application information based on a lottery. In this case, when it is determined that the specified application information corresponds to the privilege target commodity information, the privilege granting unit 2134 performs the lottery and determines whether the user wins the lottery. When the privilege granting unit 2134 determines that the user wins the lottery, the privilege granting unit 2134 grants the privilege corresponding to the application information. In this way, it is possible to restrict the user to which the privilege is granted and reduce cost related to the granting of the privilege on a side supplying the privilege.

The settlement unit 2135 performs the settlement based on the store ID stored in association with the settlement token, the user ID received along with the settlement token from the user terminal 22, and the settlement price determined by the privilege granting unit 2134.

For example, the settlement unit 2135 performs a process of withdrawing a settlement price from an account of the user specified with the user ID received along with the settlement token from the user terminal 22. The settlement unit 2135 may perform a process of depositing the settlement price into an account of the store specified with the store ID stored in association with the settlement token. The settlement unit 2135 may deposit an amount obtained by deducting a settlement fee from the settlement price in the settlement device 21 into the account of the store. When the settlement of the settlement price is completed, the settlement unit 2135 notifies the user terminal 22 and the store terminal 23 that the payment is completed. The settlement unit 2135 notifies the user terminal 22 of information indicating that the privilege is granted to the user by the privilege granting unit 2134 and notifies the user terminal 22 of information indicating a discount amount as information indicating the privilege granted to the user.

Operation Sequence

Figure 11:
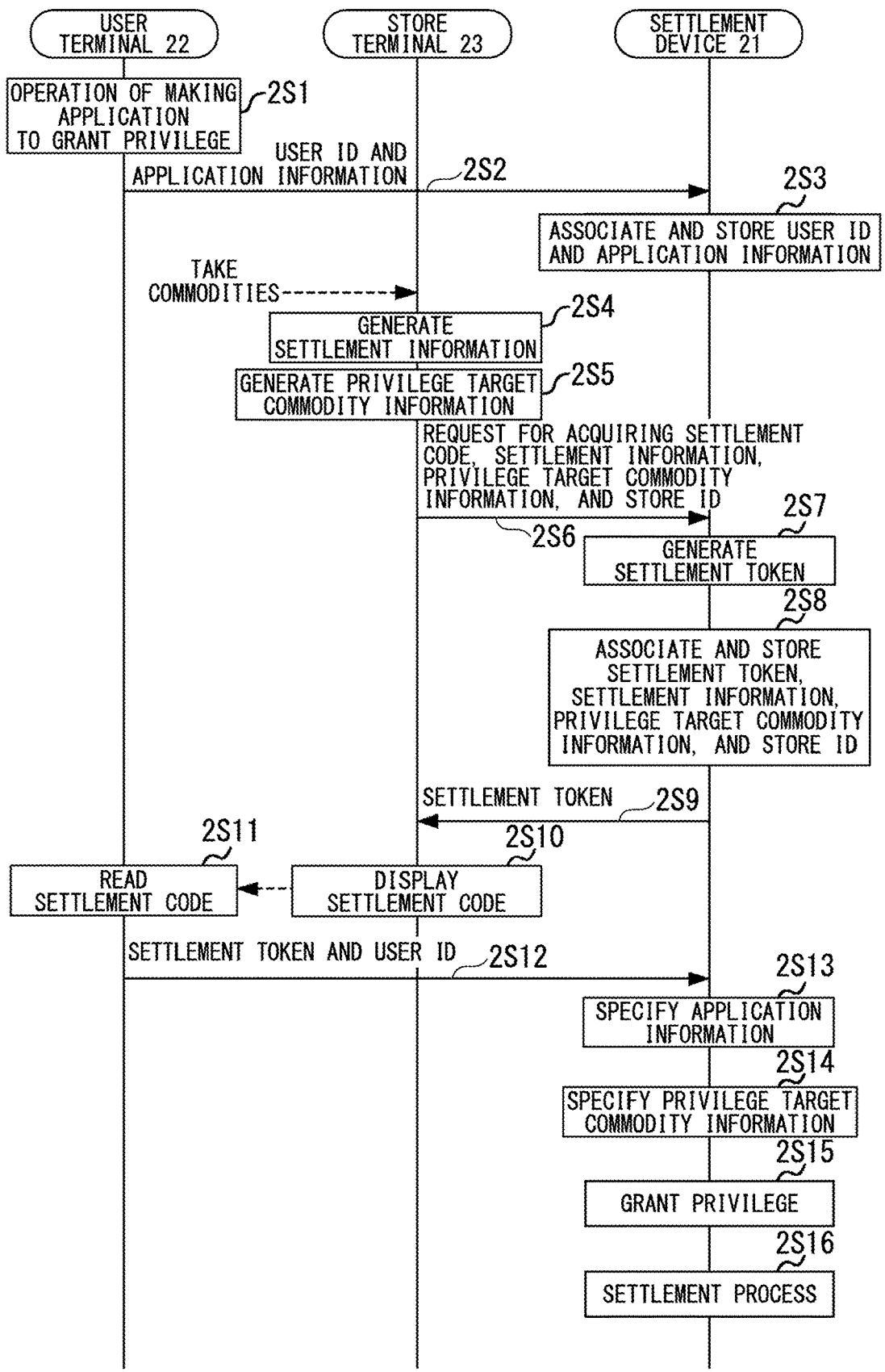
FIG. 11 is a sequence diagram illustrating a privilege granting operation in the settlement system according to the second embodiment.

FIG. 11 is a sequence diagram illustrating the settlement system 2S.

The sequence diagram illustrated in FIG. 11 starts from the time at which the user performs an operation of making an application to grant the privilege in the user terminal 22 (2S1). When the user performs the operation of making an application to grant the privilege, the request transmission unit 2262 of the user terminal 22 transmits the user ID and the application information to the settlement device 21 (2S2).

When the user ID and the application information are received, the application reception unit 2131 of the settlement device 21 associates and stores the user ID, the application information, and the application date as the application management information in the storage unit 212 (2S3).

In the store, the user selects the commodities which the user will purchase and takes the selected commodities to a store staff member using the store terminal 23. The settlement information generation unit 2361 of the store terminal 23 calculates a settlement price by acquiring the commodity ID input by the store staff member using the operation unit 231 or the commodity ID read from the barcode attached to the commodity by the reading unit 232 and specifying the price of the commodity associated with the commodity ID. The settlement information generation unit 2361 generates the settlement information including the settlement price (2S4). The target commodity specifying unit 2362 of the store terminal 23 generates the privilege target commodity information by specifying one or more target commodities among one or more commodities which are settlement targets (2S5).

When the settlement information is generated in 2S4 and the privilege target commodity information is generated in 2S5, the settlement information transmission unit 2363 transmits the request for acquiring the settlement code, the settlement information, the privilege target commodity information, and the store ID to the settlement device 21 (2S6).

When the request for acquiring the settlement code, the settlement information, the privilege target commodity information, and the store ID are acquired, the token generation unit 2132 of the settlement device 21 generates the settlement token for generating the settlement code (2S7). The token generation unit 2132 associates and stores the generated settlement token, the settlement information, the privilege target commodity information, and the store ID in the storage unit 212 (2S8). The token generation unit 2132 transmits the generated settlement token to the store terminal 23 that has transmitted the request for acquiring the settlement code (2S9).

The code generation unit 2364 of the store terminal 23 generates the settlement code based on the settlement token received from the settlement device 21 and displays the generated settlement code on the display unit 234 (2S10). When the user operates the user terminal 22, the user terminal 22 reads the settlement code displayed on the store terminal 23 (2S11). The token transmission unit 2263 of the user terminal 22 transmits the settlement token obtained from the settlement code and the user ID to the settlement device 21 (2S12).

When the token reception unit 2133 receives the settlement token and the user ID from the user terminal 22, the privilege granting unit 2134 specifies the application information in association with the received user ID and stored in the storage unit 212 (2S13). The privilege granting unit 2134 specifies the privilege target commodity information associated with the received settlement token and stored in the storage unit 212 (2S14).

When the specified application information corresponds to the privilege target commodity information, the privilege granting unit 2134 grants the privilege corresponding to the application information to the user (2S15). Here, a discount from the settlement price indicated by the settlement information associated with the settlement token is given as the privilege.

Subsequently, the settlement unit 2135 performs the settlement based on the store ID associated with the settlement token, the user ID received along with the settlement token, and the settlement price determined by the privilege granting unit 2134 (2S16).

MODIFICATION EXAMPLES

In the foregoing description, the store terminal 23 requests the settlement device 21 to acquire the settlement code when the user purchases the commodities, but the present invention is not limited thereto. For example, when only the commodities of which the prices are the same are treated and purchase prices of the commodities of a user are constant in the store, the store terminal 23 may transmit the settlement information, the privilege target commodity information, and the request for acquiring the settlement code to the settlement device 21 in advance before the user purchases the commodities.

FIG. 12 is a sequence diagram illustrating an operation of the settlement system 2S when the store terminal 23 performs a request for acquiring the settlement code before a user purchases commodities.

As illustrated in FIG. 12, the settlement information transmission unit 2363 first transmits the request for acquiring the settlement code, the settlement information, the privilege target commodity information, and the store ID to the settlement device 21 (2S21).

When the settlement information, the privilege target commodity information, the store ID, and the request for acquiring the settlement code are received from the store terminal 23, the token generation unit 2132 of the settlement device 21 generates the settlement token (2S22). The token generation unit 2132 associates and stores the generated settlement token, the settlement information, the privilege target commodity information, and the store ID in the storage unit 212 (2S23). The token generation unit 2132 transmits the generated settlement token to the store terminal 23 that has transmitted the request for acquiring the settlement code (2S24).

When the settlement token is received from the settlement device 21, the code generation unit 2364 stores the settlement token in the storage unit 235 (2S25).

Thereafter, when the user performs the operation of making the application to grant the privilege using the user terminal 22 (2S26), the request transmission unit 2262 of the user terminal 22 transmits the user ID and the application information to the settlement device 21 (2S27). When the user ID and the application information are received, the application reception unit 2131 of the settlement device 21 associates and stores the user ID, the application information, and the application date as the application management information in the storage unit 212 (2S28).

In the store, the user selects the commodities which the user will purchase and takes the selected commodities to a store staff member using the store terminal 23. Here, as described above, since only the commodities of which the prices are the same are treated and the purchase price of the user is normally constant irrespective of the kinds of commodities in the store, the code generation unit 2364 of the store terminal 23 generates the settlement code based on the settlement token stored in the storage unit 235 and displays the generated settlement code on the display unit 234 (2S29). The user operates the user terminal 22 and causes the user terminal 22 to read the settlement code displayed on the store terminal 23 (2S30). The token transmission unit 2263 of the user terminal 22 transmits the user ID and the settlement token obtained from the settlement code to the settlement device 21 (2S31).

Thereafter, the privilege granting unit 2134 performs the same process as the process of 2S13 to 2S15 illustrated in FIG. 11 and grants the privilege to the user (2S32 to 2S34). Here, a discount from the settlement price is given as the privilege. The settlement unit 2135 performs similar settlement to the process of 2S16 illustrated in FIG. 11 (2S35).

In the sequence, the code generation unit 2364 generates the settlement code based on the settlement token stored in the storage unit 235 when the user purchases the commodities, and displays the settlement code on the display unit 234, but the present invention is not limited thereto. The store staff member of the store terminal 23 may print the settlement code on a paper sheet or the like in advance instead of displaying the settlement code on the store terminal 23, and may present the settlement code printed on the paper sheet or the like to the user when the user purchases commodities.

Advantages in Settlement System 2S

As described above, the settlement device 21 associates and stores the user ID and the application information in the storage unit 212 when the user ID and the application information indicating an application to grant the privilege at the time of purchase of the target commodity are acquired. When the settlement information, the privilege target commodity information, and the request for acquiring the settlement code are received from the store terminal 23, the settlement device 21 generates the settlement token and associates and stores the generated settlement token and the privilege target commodity information in the storage unit 212 and transmits the settlement token and the privilege target commodity information to the store terminal 23. The store terminal 23 generates the settlement code based on the received settlement token. When the user ID and the settlement token are received from the user terminal 22 reading the settlement code displayed by the store terminal 23 based on the settlement token, the settlement device 21 specifies the application information associated with the received user ID and specifies the privilege target commodity information associated with the received settlement token. When the specified application information corresponds to the privilege target commodity information, the settlement device 21 grants the privilege corresponding to the application information to the user. In this way, the store staff member in the store can perform an adjustment process by merely reading the settlement code and the user of the user terminal 22 can receive the discount as the privilege at the time of settlement. Therefore, the settlement process for electronic settlement involving the granting of the privilege can be simplified.

The embodiments of the present invention have been described above, but the technical scope of the present invention is not limited to the scope described in the foregoing embodiments and various modifications and changes can be made within the scope of the gist of the present invention. For example, a specific embodiment of integration and distribution of devices is not limited to the foregoing embodiments and some or all of the devices can be distributed or integrated functionally or physically in any unit. Novel embodiments realized in any combination of a plurality of embodiments are also included in embodiments of the present invention. The advantages of the novel embodiments realized in the combination include the advantages of the original embodiments.

What is claimed is:

1. A privilege granting method causing a computer to perform:
    acquiring a user identifier for specifying a user and application information indicating an application to grant a privilege at the time of purchase of a target commodity to which the privilege is granted in response to purchase from the user;
    associating and storing the application information and the user identifier in a storage unit;
    receiving the user identifier and a request for acquiring a settlement code for settlement in a store by the user from a user terminal of the user;
    generating a settlement token for generating the settlement code when the request for acquiring the settlement code is received;
    transmitting the generated settlement token to the user terminal;
    receiving settlement information used to perform settlement of one or more commodities, the settlement token, and privilege target commodity information for specifying one or more target commodities among the one or more commodities from a store terminal that is configured to read the settlement code displayed by the user terminal according to the settlement token;
    specifying the application information associated with the user identifier corresponding to the settlement token and stored in the storage unit when the settlement token is received from the store terminal; and
    granting the privilege corresponding to the application information to the user when the specified application information corresponds to the received privilege target commodity information.

2. The privilege granting method according to claim 1, wherein, in the granting of the privilege, the computer is configured to apply a discount of a price as the privilege to a settlement price corresponding to the settlement; and
    wherein the method further comprises performing settlement according to the settlement price to which the privilege is applied by the computer.

3. The privilege granting method according to claim 1, wherein, in the granting of the privilege, the computer is configured to determine whether the settlement token received from the user terminal matches the settlement token transmitted to the store terminal by determining whether the settlement token received from the user terminal is stored in the storage unit, and grant the privilege corresponding to the application information to the user when the settlement token received from the user terminal matches the settlement token transmitted to the store terminal.

4. The privilege granting method according to claim 1, wherein, in the receiving, the computer receives the privilege target commodity information generated by allowing the store terminal to specify the one or more target commodities among the one or more commodities which are settlement targets from the store terminal.

5. The privilege granting method according to claim 1, further comprising:
    determining, by the computer, whether to receive an application to grant the privilege according to a predetermined condition when the user identifier and the application information are received,
    wherein, in the storing, the computer associates and stores the application information and the user identifier in a storage unit when the computer determines to receive the application to grant the privilege in the determining.

6. A privilege granting device comprising:
    an application reception unit configured to associate and store a user identifier for specifying a user and application information indicating an application to grant a privilege at the time of purchase of a target commodity to which the privilege is granted in response to the purchase in a storage unit when the user identifier and the application information are acquired from the user;
    a token generation unit configured to generate a settlement token for generating a settlement code and transmit the generated settlement token to a user terminal of the user when the user identifier and a request for acquiring the settlement code for settlement in a store by the user are received from the user terminal;
    a settlement information reception unit configured to receive settlement information used to perform settlement of one or more commodities, the settlement token, and privilege target commodity information for specifying one or more target commodities among the one or more commodities from a store terminal that is configured to read the settlement code displayed by the user terminal according to the settlement token; and
    a privilege granting unit configured to specify the application information associated with the user identifier corresponding to the settlement token and stored in the storage unit when the settlement token is received from the store terminal and to grant the privilege corresponding to the application information to the user when the specified application information corresponds to the received privilege target commodity information.

7. A privilege granting method causing a computer to perform:
    acquiring a user identifier for specifying a user and application information indicating an application to grant a privilege at the time of purchase of a target commodity to which the privilege is granted in response to purchase from the user;
    associating and storing the application information and the user identifier in a storage unit;
    receiving settlement information used to perform settlement of one or more commodities and privilege target commodity information for specifying one or more target commodities among the one or more commodities from a store terminal and receiving a request for acquiring a settlement code for settling in a store by the user;
    generating a settlement token for generating the settlement code when the request for acquiring the settlement code is received;
    associating and storing the generated settlement token and the privilege target commodity information in the storage unit;
    transmitting the generated settlement token to the store terminal;
    receiving the settlement token and the user identifier from a user terminal that is configured to read the settlement code displayed by the store terminal according to the settlement token; and
    granting the privilege corresponding to the application information to the user when the application information associated with the user identifier received from the user terminal and stored in the storage unit corresponds to the privilege target commodity information associated with the settlement token received from the user terminal and stored in the storage unit.

8. The privilege granting method according to claim 7,
wherein, in the granting of the privilege, the computer is configured to apply a discount of a price as the privilege to a settlement price corresponding to the settlement; and wherein the method further comprises performing settlement according to the settlement price to which the privilege is applied by the computer.

9. The privilege granting method according to claim 7, wherein, in the granting of the privilege, the computer is configured to determine whether the settlement token received from the user terminal matches the settlement token transmitted to the store terminal by determining whether the settlement token received from the user terminal is stored in the storage unit, and grant the privilege corresponding to the application information to the user when the settlement token received from the user terminal matches the settlement token transmitted to the store terminal.

10. The privilege granting method according to claim 7, further comprising:
receiving, by the computer, the privilege target commodity information generated by allowing the store terminal to specify one or more target commodities among one or more commodities which are settlement targets from the store terminal.

11. The privilege granting method according to claim 7, further comprising:
determining, by the computer, whether to receive an application to grant the privilege according to a predetermined condition when the user identifier and the application information are received, wherein, in the storing, the computer associates and stores the application information and the user identifier in a storage unit when the computer is configured to determine to receive the application to grant the privilege in the determining.

\* \* \* \* \*